US011885159B2

(12) United States Patent
Johann et al.

(10) Patent No.: US 11,885,159 B2
(45) Date of Patent: Jan. 30, 2024

(54) POWER ACTUATOR HAVING CAM-DRIVEN DUAL CABLE ACTUATION MECHANISM FOR USE WITH VEHICULAR CLOSURE LATCH ASSEMBLY

(71) Applicant: MAGNA BOCO GMBH, Wuppertal (DE)

(72) Inventors: Henrik Johann, Wermeiskirchen (DE); Jan Holbein, Cologne (DE); Bernardo Erices, Bergisch Gladbach (DE)

(73) Assignee: MAGNA CLOSURES INC., Newmarket (CA)

( * ) Notice: Subject to any disclaimer, the term of this patent is extended or adjusted under 35 U.S.C. 154(b) by 661 days.

(21) Appl. No.: 16/838,801

(22) Filed: Apr. 2, 2020

(65) Prior Publication Data

US 2020/0318400 A1 Oct. 8, 2020

Related U.S. Application Data

(60) Provisional application No. 62/827,939, filed on Apr. 2, 2019.

(51) Int. Cl.
*E05B 79/20* (2014.01)
*E05B 81/34* (2014.01)
(Continued)

(52) U.S. Cl.
CPC .............. *E05B 81/16* (2013.01); *E05B 79/20* (2013.01); *E05B 81/14* (2013.01); *E05B 81/20* (2013.01);
(Continued)

(58) Field of Classification Search
CPC .......... E05B 79/20; E05B 81/06; E05B 81/14; E05B 81/18; E05B 81/20; E05B 81/25;
(Continued)

(56) References Cited

U.S. PATENT DOCUMENTS 3,998,482 A 12/1976 Nozaki et al.
4,986,579 A 1/1991 Ishikawa
(Continued)

FOREIGN PATENT DOCUMENTS

CN 105378200 A 3/2016
CN 105421909 A 3/2016
(Continued)

OTHER PUBLICATIONS

Computer Generated Translation for DE 102013008415 A1, Generated on Jan. 6, 2023, https://worldwide.espacenet.com/ (Year: 2023).*

(Continued)

*Primary Examiner* — Alyson M Merlino
(74) *Attorney, Agent, or Firm* — Dickinson Wright PLLC

(57) ABSTRACT

A power actuator for actuating separate mechanically driven members includes a motor and a drive gear configured to be selectively driven in opposite directions. A common gear is configured in operable communication with the drive gear to be selectively driven from a home position in opposite directions in response to movement of the drive gear. A first drive member is attached to the common gear with a first cable extending between the first drive member and one of the mechanically driven members. A second drive member is attached to the common gear with a second cable extending between the second drive member and the other of the mechanically driven members. Movement of the common gear from the home position in one direction moves of one mechanically driven member and movement of the common gear from the home position in an opposite direction moves the other mechanically driven member.

18 Claims, 19 Drawing Sheets

(51) Int. Cl.

| | |
|---|---|
| ***E05B 81/20*** | (2014.01) |
| ***E05B 81/14*** | (2014.01) |
| ***E05B 85/26*** | (2014.01) |
| ***E05B 83/24*** | (2014.01) |
| ***E05B 81/16*** | (2014.01) |
| ***E05B 81/24*** | (2014.01) |
| ***E05B 81/64*** | (2014.01) |

(52) U.S. Cl.
CPC .............. *E05B 81/25* (2013.01); *E05B 81/34* (2013.01); *E05B 81/64* (2013.01); *E05B 83/24* (2013.01); *E05B 85/26* (2013.01); *E05Y 2900/536* (2013.01)

(58) Field of Classification Search
CPC .......... E05B 81/34; E05B 81/50; E05B 81/56; E05B 81/64; E05B 81/66; E05B 81/72; E05B 81/74; E05B 83/16; E05B 83/18; E05B 83/24
See application file for complete search history.

(56) References Cited

U.S. PATENT DOCUMENTS

| | | | | |
|---|---|---|---|---|
| 5,466,021 | A | 11/1995 | Ishihara et al. | |
| 5,516,164 | A | 5/1996 | Kobayashi | |
| 5,738,393 | A | 4/1998 | Chao | |
| 5,944,367 | A | 8/1999 | Imaizumi et al. | |
| 6,168,216 | B1 * | 1/2001 | Nakajima | E05B 81/20 292/216 |
| 7,575,270 | B2 | 8/2009 | Nagai et al. | |
| 7,614,670 | B2 * | 11/2009 | Hayakawa | E05B 81/20 292/201 |
| 7,627,986 | B2 | 12/2009 | Hirai et al. | |
| 8,033,584 | B2 * | 10/2011 | Akizuki | E05B 81/20 292/201 |
| 9,187,936 | B2 | 11/2015 | Kim et al. | |
| 9,677,302 | B2 | 6/2017 | Coleman | |
| 9,863,170 | B2 | 1/2018 | Park et al. | |
| 9,920,556 | B2 | 3/2018 | Byun et al. | |
| 10,465,425 | B2 | 11/2019 | Clark et al. | |
| 10,767,397 | B2 | 9/2020 | Ottino et al. | |
| 11,414,904 | B2 * | 8/2022 | Klein | E05B 81/56 |
| 2004/0227357 | A1 * | 11/2004 | Ishihara | E05B 79/20 292/216 |
| 2005/0284201 | A1 | 12/2005 | Kachouh et al. | |
| 2006/0226661 | A1 | 10/2006 | Moore | |
| 2012/0161456 | A1 | 6/2012 | Riedmayr et al. | |
| 2016/0168883 | A1 | 6/2016 | Konchan | |
| 2016/0186468 | A1 | 6/2016 | Ilea | |
| 2017/0089105 | A1 * | 3/2017 | Margheritti | E05B 81/20 |
| 2018/0080266 | A1 | 3/2018 | Lebsak et al. | |
| 2018/0320720 | A1 | 11/2018 | Erices et al. | |
| 2018/0347240 | A1 * | 12/2018 | Jeong | E05B 79/20 |
| 2019/0003214 | A1 | 1/2019 | Cumbo et al. | |
| 2019/0024424 | A1 | 1/2019 | Brickner | |
| 2019/0128028 | A1 | 5/2019 | Herline et al. | |
| 2019/0145135 | A1 | 5/2019 | Lebsak et al. | |
| 2019/0226247 | A1 | 7/2019 | Johann et al. | |
| 2019/0292817 | A1 * | 9/2019 | Tomaszewski | E05B 81/20 |
| 2019/0301212 | A1 | 10/2019 | Digel et al. | |
| 2019/0368237 | A1 | 12/2019 | Distefano et al. | |
| 2020/0199916 | A1 | 6/2020 | Cumbo et al. | |
| 2021/0238898 | A1 | 8/2021 | Lebsak et al. | |

FOREIGN PATENT DOCUMENTS

| | | | | |
|---|---|---|---|---|
| CN | 106168089 | A | 11/2016 | |
| CN | 109424278 | A | 3/2019 | |
| DE | 3911135 | A1 | 10/1990 | |
| DE | 19533196 | A1 | 3/1997 | |
| DE | 19535065 | A1 | 3/1997 | |
| DE | 19804516 | A1 | 8/1999 | |
| DE | 19854790 | A1 | 5/2000 | |
| DE | 10242830 | A1 | 12/2003 | |
| DE | 102004063239 | A1 | 1/2006 | |
| DE | 10065569 | B4 | 12/2007 | |
| DE | 202008012706 | U1 | 12/2008 | |
| DE | 202008012707 | U1 | 12/2008 | |
| DE | 202008012086 | U1 | 1/2009 | |
| DE | 102007056653 | A1 | 5/2009 | |
| DE | 202013004589 | U1 | 8/2014 | |
| DE | 102013008415 | A1 * | 11/2014 | E05B 81/20 |
| DE | 10231825 | B4 | 8/2016 | |
| DE | 102015224224 | A1 * | 9/2016 | E05B 79/20 |
| DE | 102018100254 | A1 | 7/2019 | |
| DE | 10114065 | A1 | 11/2022 | |
| EP | 1700989 | A2 * | 9/2006 | E05B 79/20 |
| EP | 1790803 | A2 | 5/2007 | |
| EP | 2060711 | A2 | 5/2009 | |

OTHER PUBLICATIONS

Chinese Office Action and Search Report from the Chinese Patent Office for related Chinese Application No. 202010255719.5 dated Apr. 6, 2021, English Translation Included, 15 page(s).

* cited by examiner

FIG. 2A

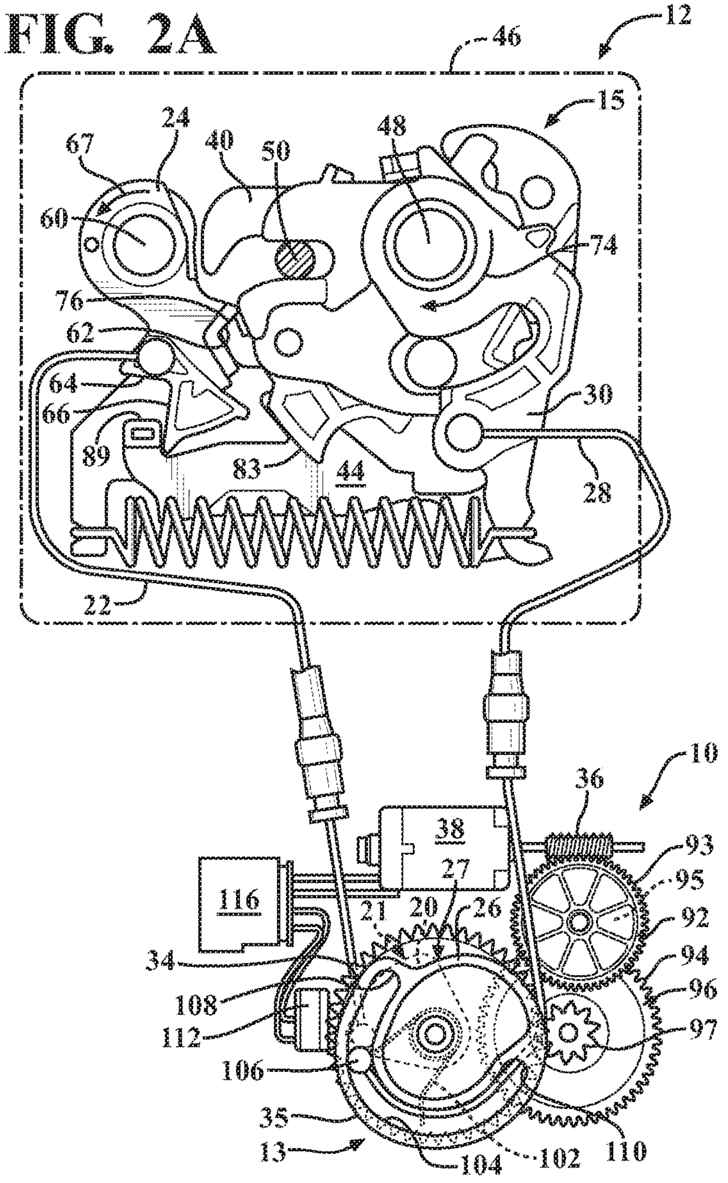

FIG. 2B

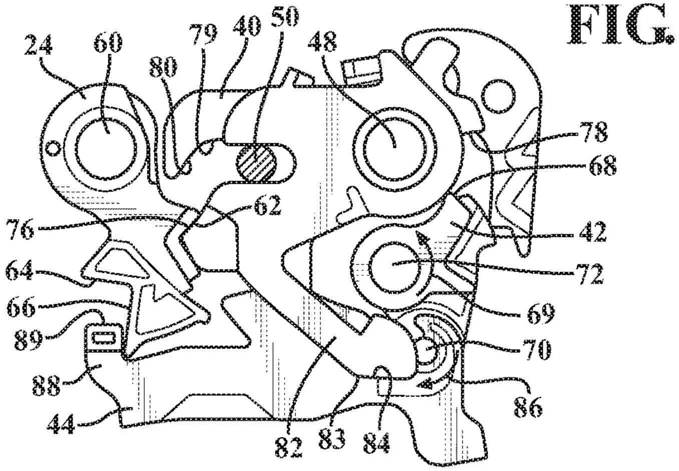

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 2C

FIG. 3A

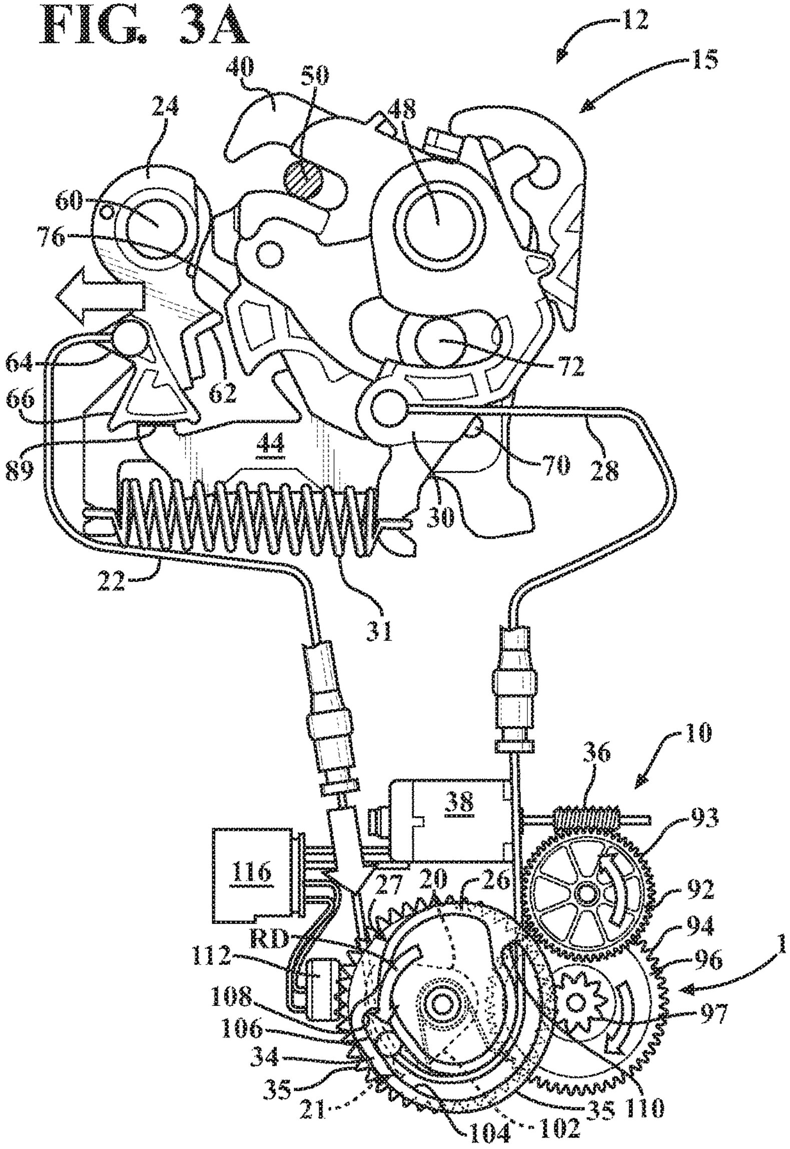

FIG. 3B

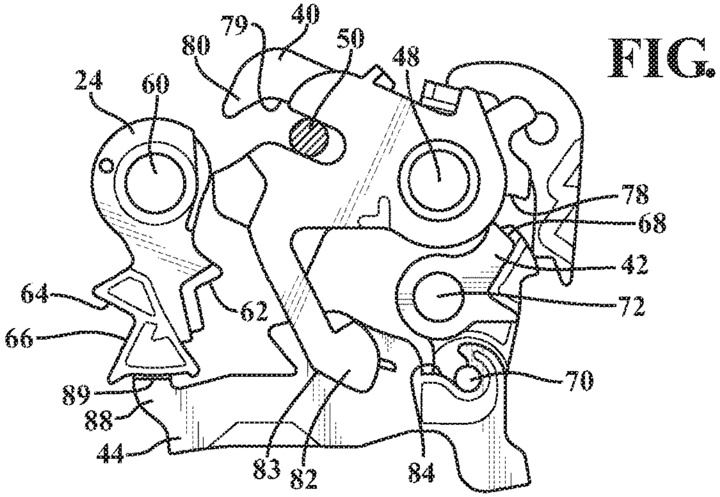

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 3C

FIG. 4A

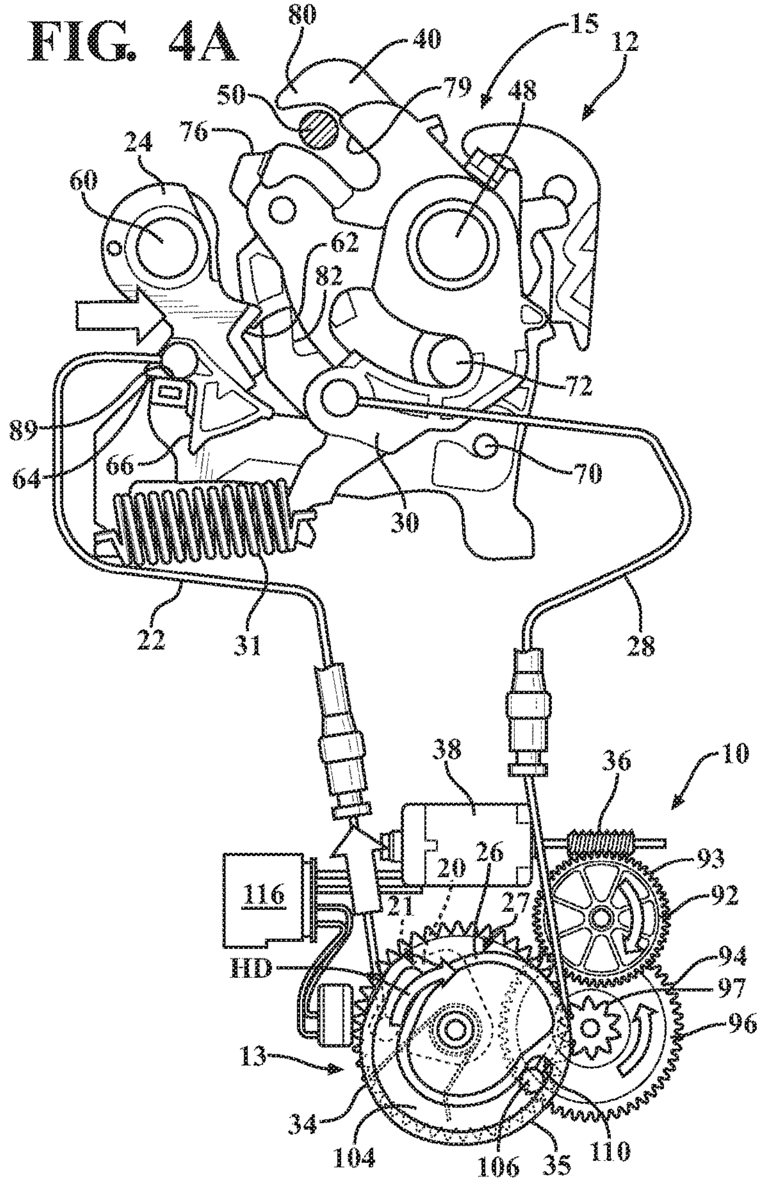

FIG. 4B

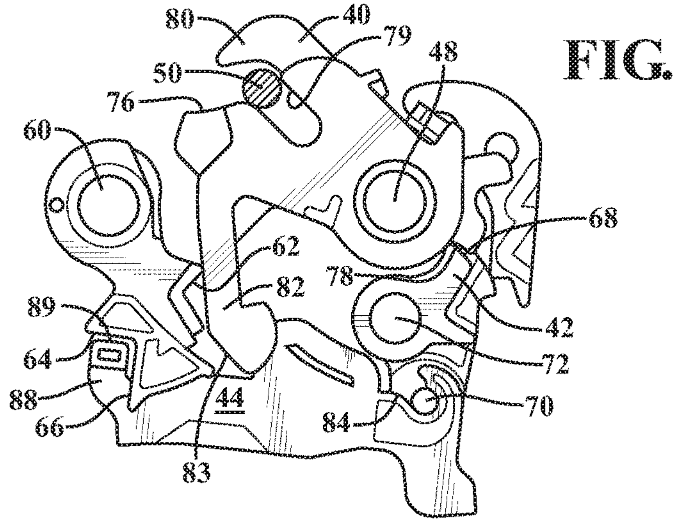

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 4C

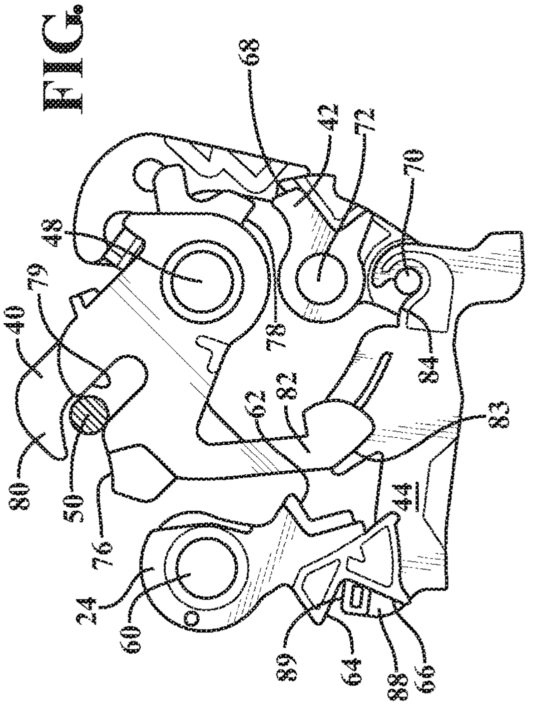

FIG. 5B

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 5C

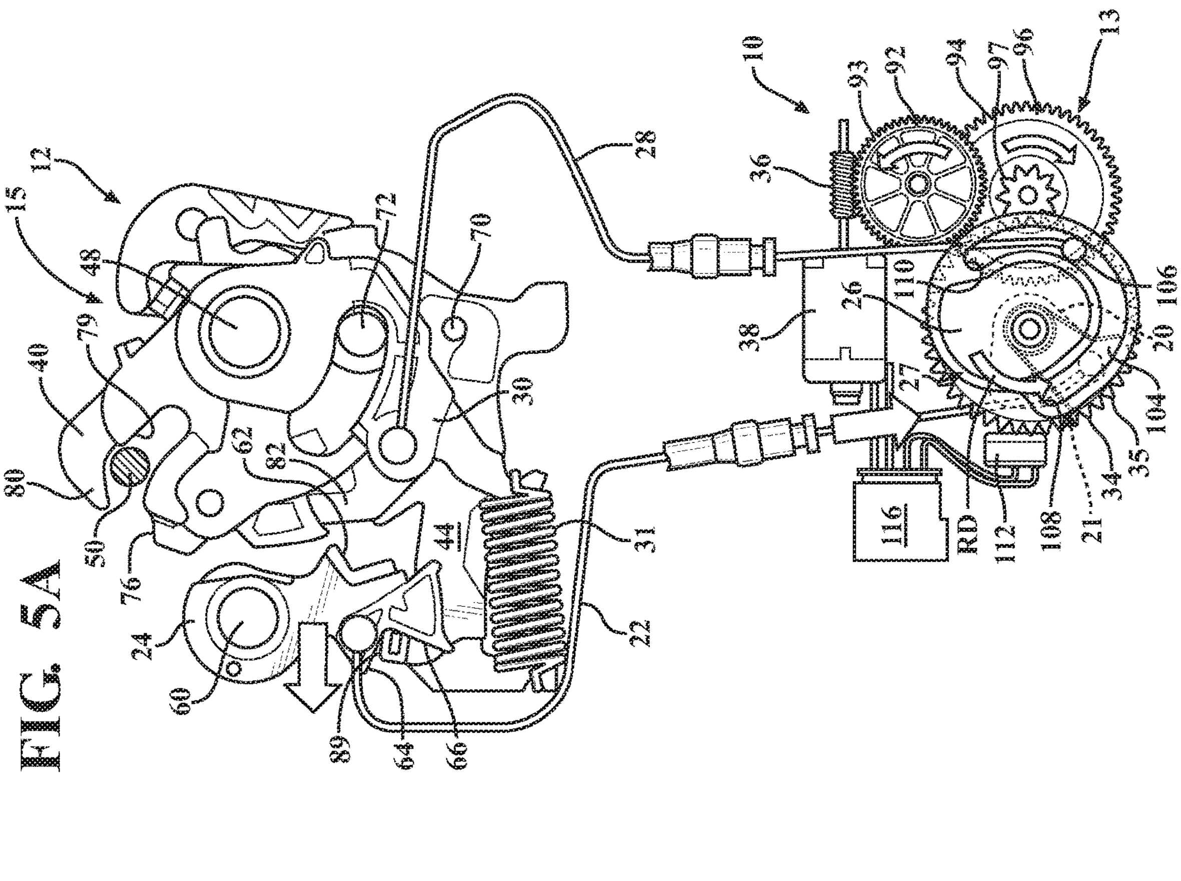

FIG. 5A

FIG. 6A

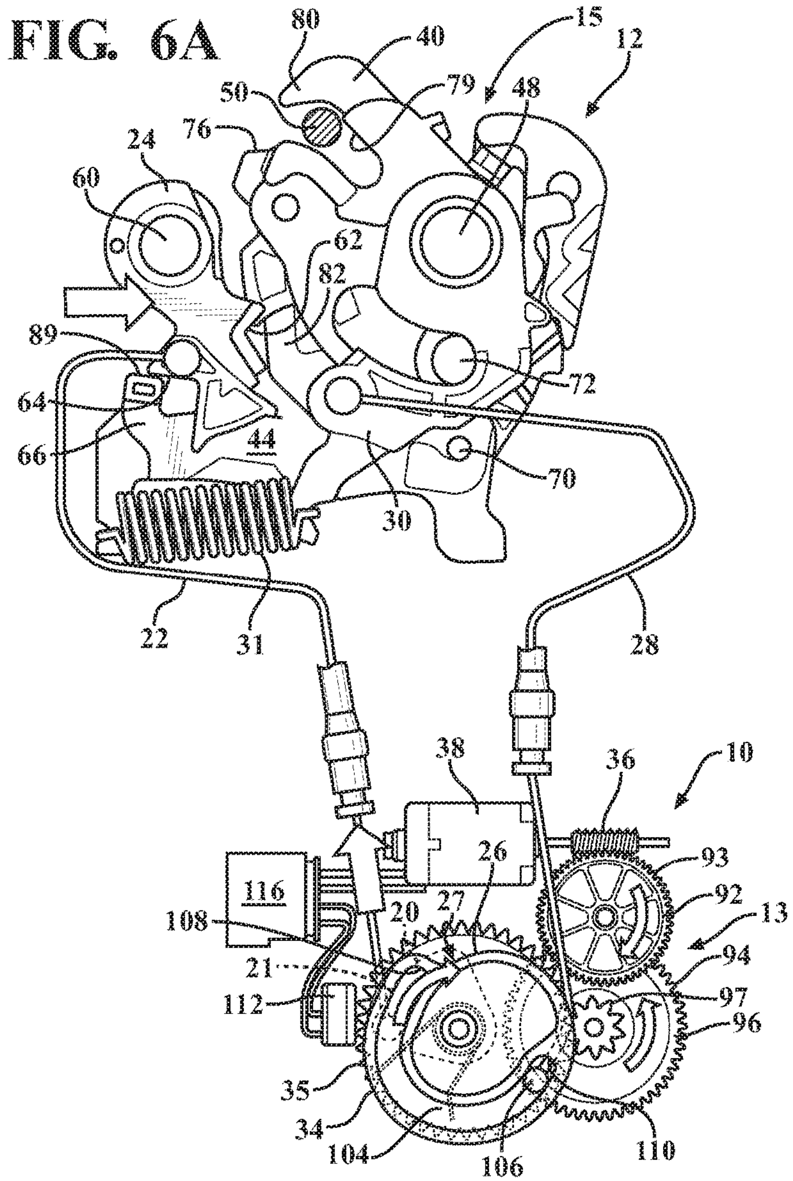

FIG. 6B

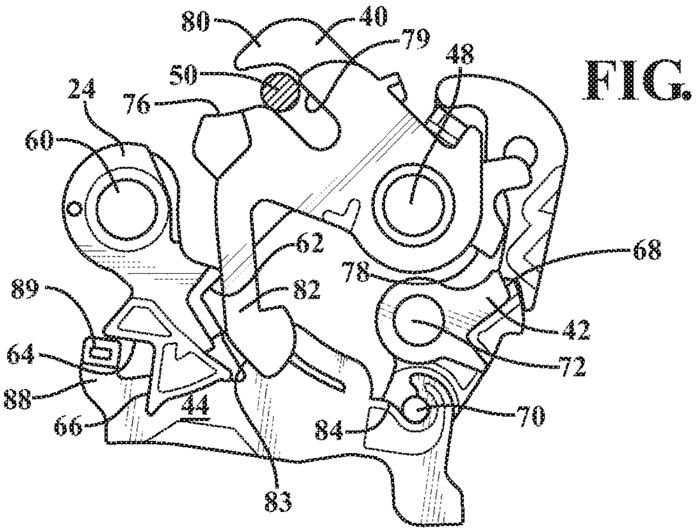

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 6C

FIG. 7A

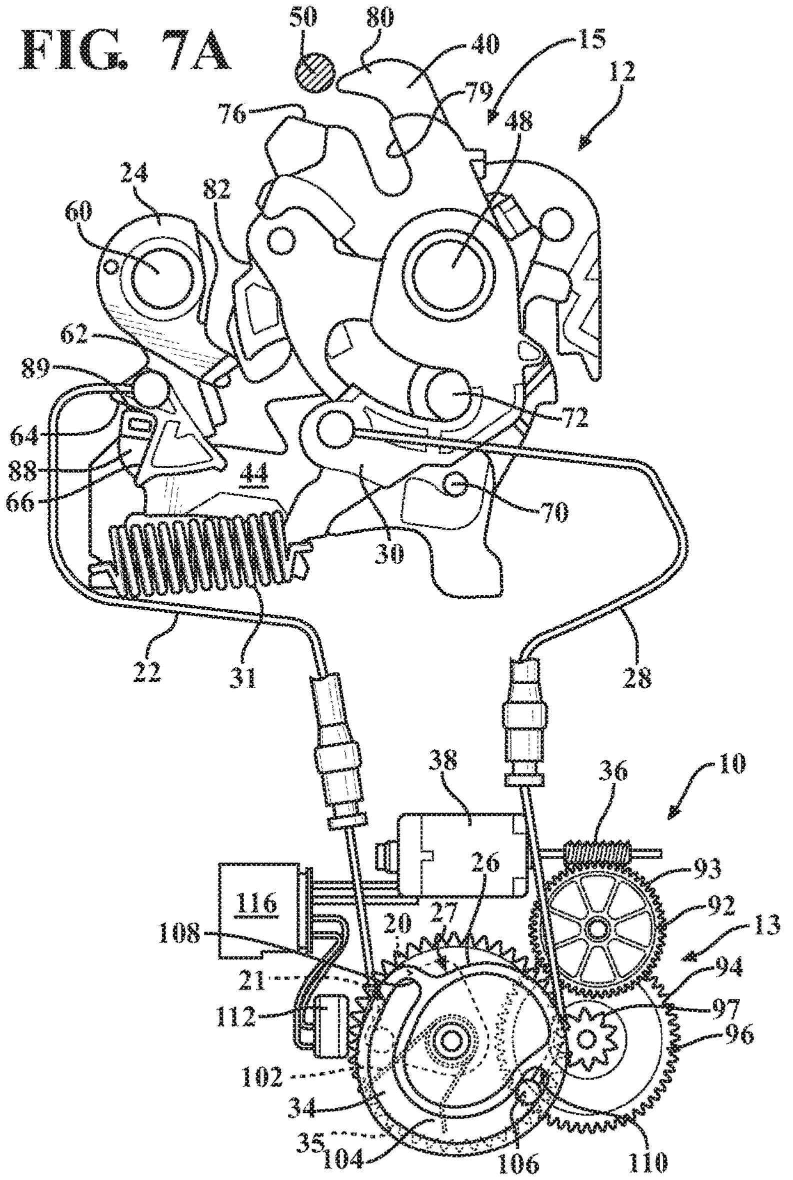

FIG. 7B

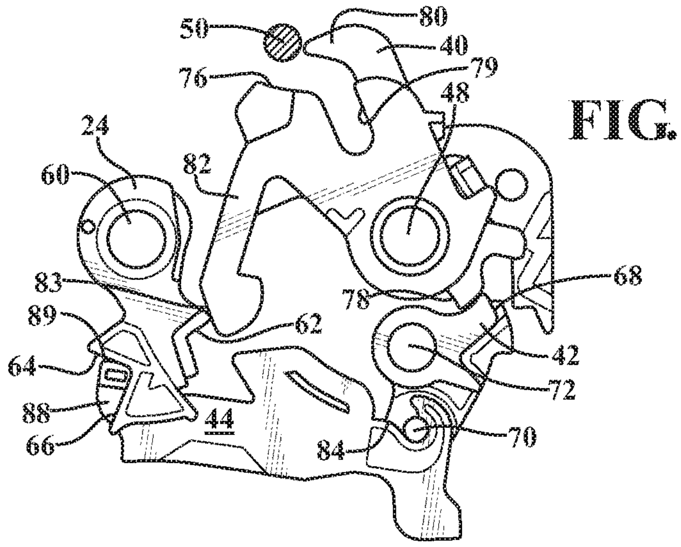

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator in home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 7C

FIG. 8A

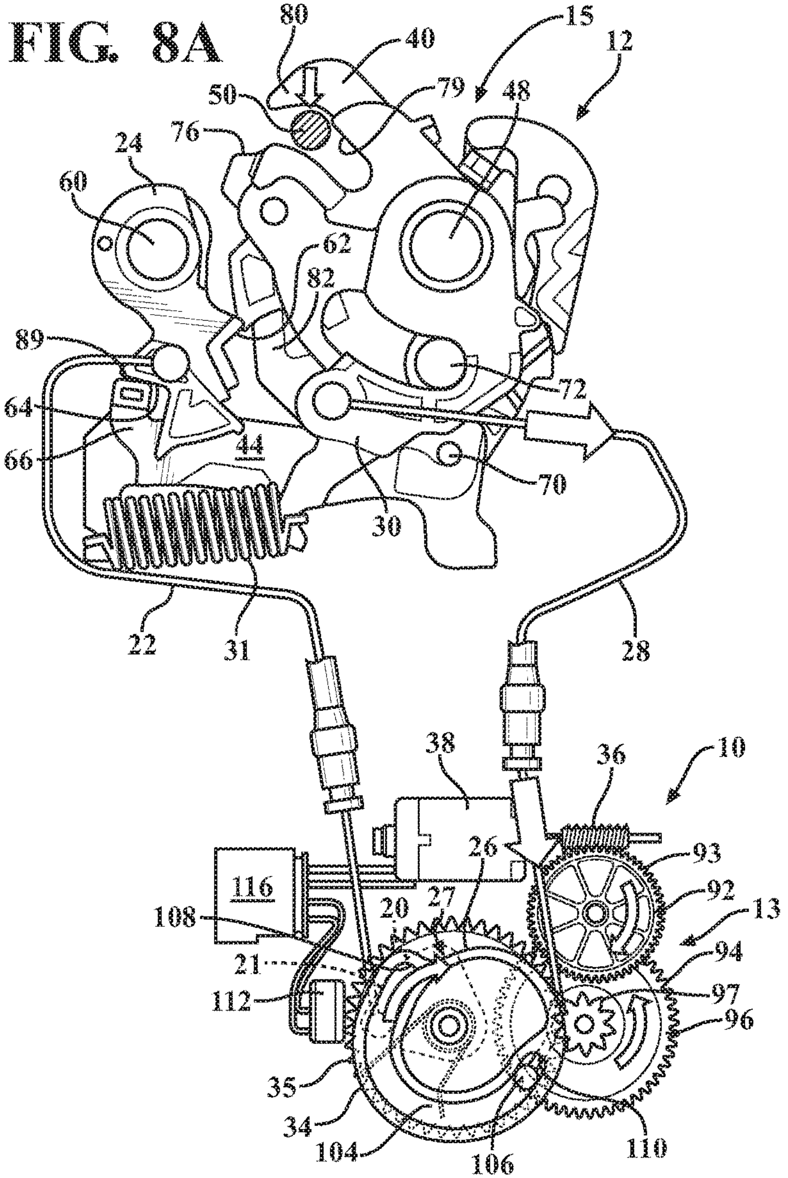

FIG. 8B

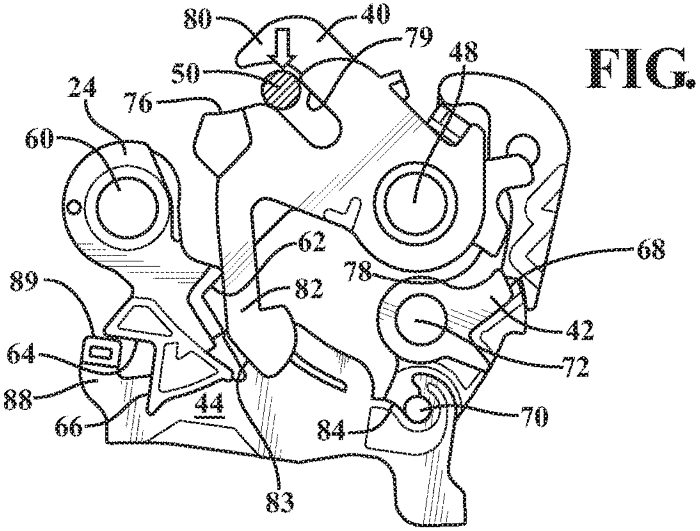

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 8C

FIG. 9A

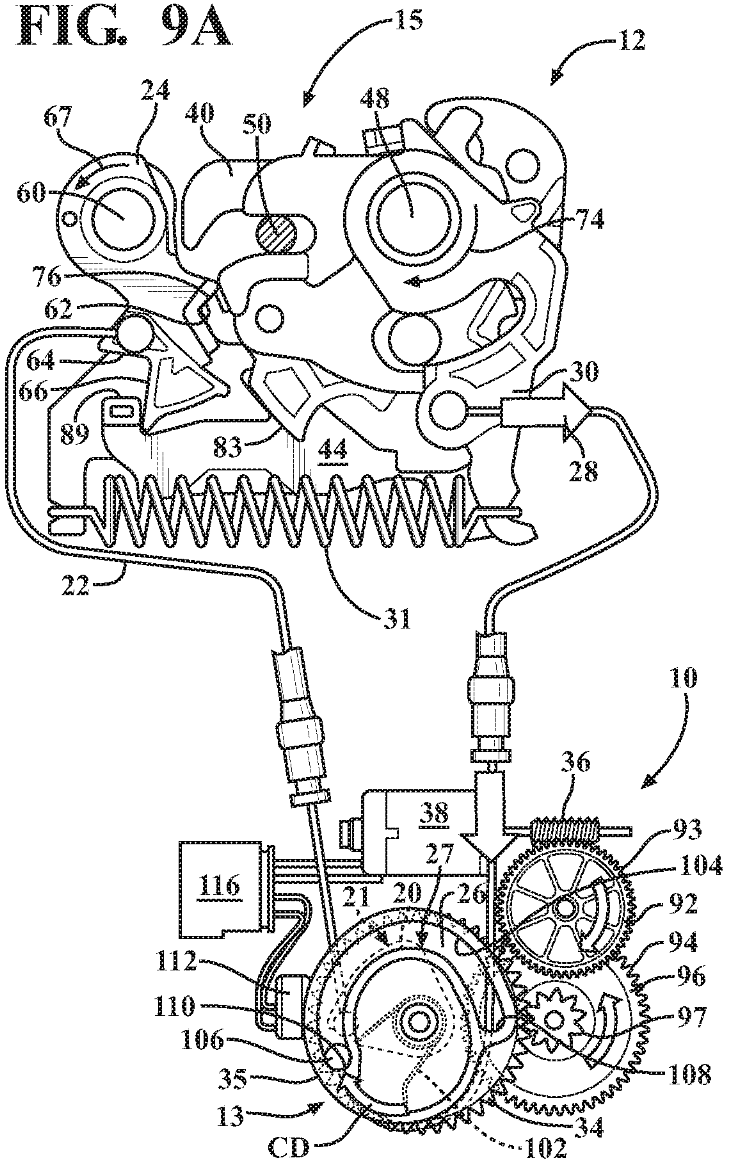

FIG. 9B

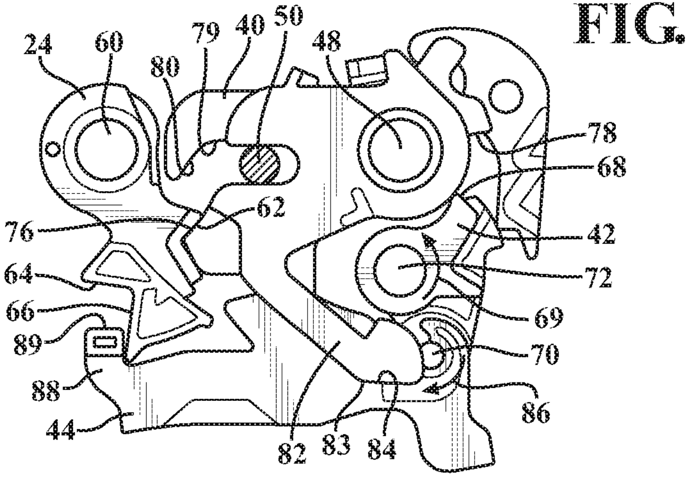

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 9C

FIG. 10A

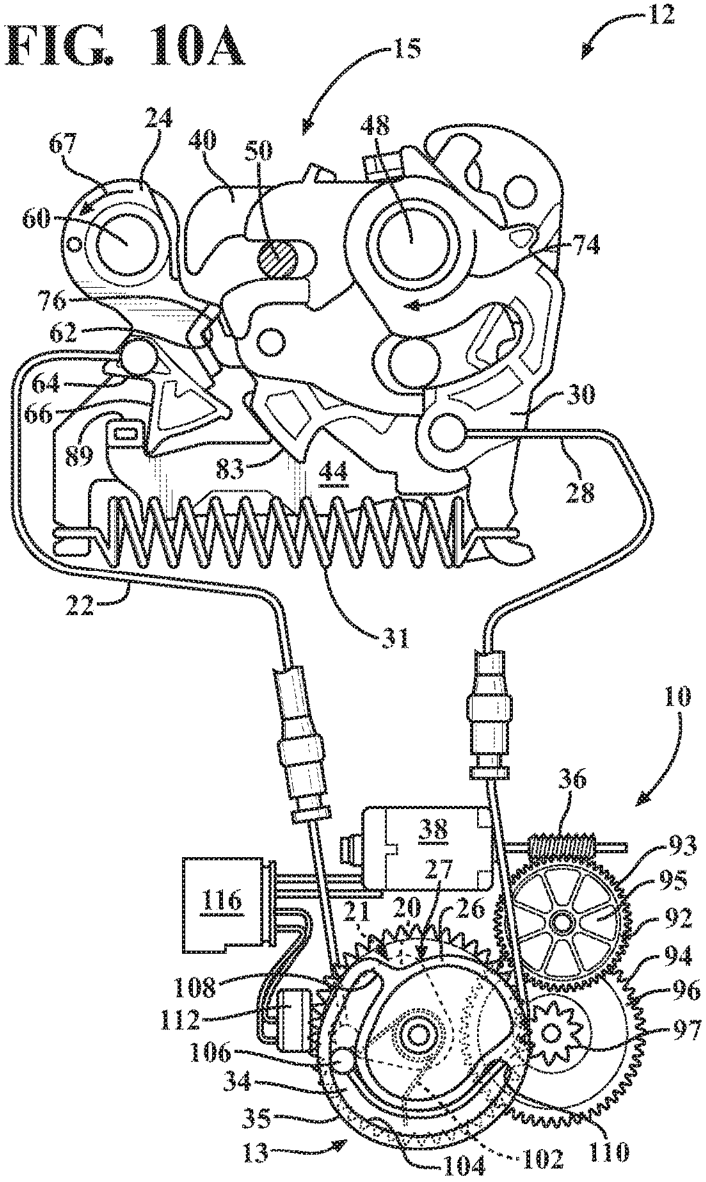

FIG. 10B

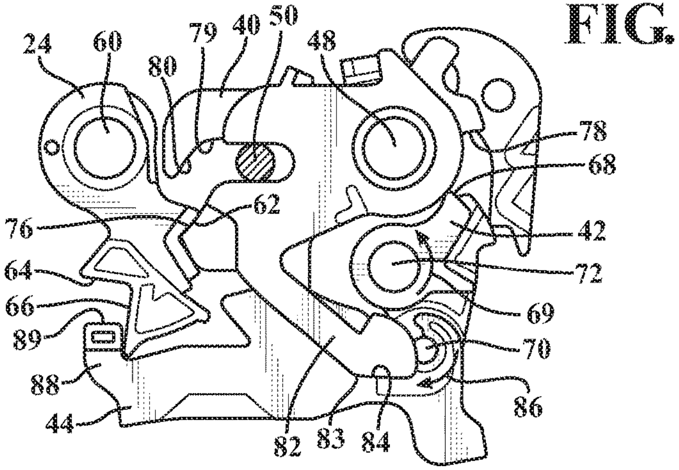

| | Actuator | Latch |
|---|---|---|
| 1 | Actuator in home position | Latch closed |
| 2 | Actuator rotates in release-direction | Pawl released; Pop-Up Function |
| 3 | Actuator rotates back to home position | Latch in secondary position |
| 4 | Actuator rotates in release-direction | Pawl released; Latch open |
| 5 | Actuator rotates back to home position | Latch open |
| 6 | Actuator in home position | Latch in secondary position |
| 7 | Actuator rotates cinch-direction | Ratchet is pulled into primary position |
| 8 | Actuator rotates back to home position | Latch closed |

FIG. 10C

POWER ACTUATOR HAVING CAM-DRIVEN DUAL CABLE ACTUATION MECHANISM FOR USE WITH VEHICULAR CLOSURE LATCH ASSEMBLY

CROSS-REFERENCE TO RELATED APPLICATION

This application claims the benefit of U.S. Provisional Application Ser. No. 62/827,939, filed Apr. 2, 2019, which is incorporated herein by reference in its entirety.

FIELD

The present disclosure relates to generally to closure panels for motor vehicles, and more particularly, to power actuators for use with power-actuated mechanisms of closure panels.

BACKGROUND

Motor vehicle closure panels, including various types of doors and various types of hoods, typically include power-actuated mechanisms, such as door presenters and latches with cinches, for example. Such power-actuated mechanisms are known to include features operable via selective actuation via one or more cables. The separate cables are typically actuated via separate dedicated actuators located remotely from one another. As such, space is needed for the separate actuators. Further, in some instances, coordinated movement of a pair cables configured in operable communication with separate ones of the actuators is needed to ensure desired and proper functioning of one or more of the power-actuated mechanisms and the features associated therewith. As such, a control mechanism must be configured in electrical communication with the separate actuators to ensure coordinated action thereof to ensure properly timed actuation of the power-actuated mechanisms and the features associated therewith. Accordingly, not only is valuable space occupied by the separate actuators, but also by the control mechanism and wires extending therefrom to the actuators.

While such power-actuated mechanisms having separate actuators can function satisfactorily for their intended purpose, drawbacks related to their packaging requirements, complexity of assembly and operation, and cost associated therewith exists.

In view of the above, there remains a need to develop alternative power-actuated mechanisms and actuators therefor which address and overcome packaging limitations associated with known power-actuated mechanisms and actuators, as well as to provide increased applicability while reducing cost and complexity.

SUMMARY

This section provides a general summary of the present disclosure and is not a comprehensive disclosure of its full scope or all of its features, aspects and objectives.

In accordance with one aspect of the disclosure, a power actuator having a dual cable actuation mechanism for use with a power-actuated mechanism of a vehicular closure panel is provided.

In accordance with another aspect of the disclosure, a power actuator having a dual cable actuation mechanism for use with a latch assembly and/or closure panel presenter is provided.

In accordance with another aspect of the disclosure, a power actuator having a dual cable actuation mechanism for use with a latch assembly of a vehicle closure panel is provided.

In accordance with another aspect of the disclosure, a power actuator having a dual cable actuation mechanism for use with a latch assembly of a vehicle front hood is provided.

In accordance with another aspect of the disclosure, a power actuator having a dual cable actuation mechanism for automatically coordinating the timing of actuating pivotal movement of a pawl and a cinch lever of a latch assembly is provided.

In accordance with another aspect of the disclosure, a power actuator having a dual cable actuation mechanism including a first drive pulley configured to drive a first cable in operable communication with a first driven member and a second drive pulley configured to drive a second cable in operable communication with a second driven member is provided.

In accordance with another aspect of the disclosure, a power actuator having a dual cable actuation mechanism including a first drive pulley configured to drive a first cable in operable communication with a pawl of a latch assembly and a second drive pulley configured to drive a second cable in operable communication with a cinch mechanism of the latch assembly is provided.

In accordance with another aspect of the disclosure, the first drive pulley can be configured having a first cam surface about which the first cable is driven and the second drive pulley can be configured having a second cam surface about which the second cable is driven, wherein the first cam surface and second cam surface are separate from one another.

In accordance with another aspect of the disclosure, the first drive pulley and the second drive pulley can be configured for predetermined, selective relative rotational movement about a common axis at predetermined rotation speeds relative to one another via driven rotation of a common gear, with the common gear being rotatable in opposite first and second directions.

In accordance with another aspect of the disclosure, the first drive pulley and the second drive pulley can be fixed on opposite sides of the common gear from one another.

In accordance with another aspect of the disclosure, a sensor can be provided to determine the position of the common gear, thereby determining the relative positions of the first drive pulley and the second drive pulley, and to cause a motor of the power actuator be energized and de-energized to move the first drive pulley and the second drive pulley to the desired positions.

In accordance with another aspect of the disclosure, the radii and/or geometric shape of the first cam surface and the second cam surface can be different from one another to provide the desired drive torque and movement of the respective first cable and second cable.

In accordance with another aspect of the disclosure, the second cable can be coupled to the second drive pulley via a lost-motion connection, thereby allowing predetermined, selective relative movement between the second cable and the second drive pulley to provide desired static positioning of the second drive pulley over a predetermined range of rotational movement of the common gear and desired dynamic driving movement of the second driven mechanism, such as a cinch mechanism, over a predetermined range of rotational movement of the common gear.

In accordance with another aspect of the disclosure, the first cable can be selectively activated via wrapping engagement of the first cable about an arcuate contour of the first cam surface while the second cable remains deactivated and substantially unwrapped from the second cam surface while the common gear is rotated in the first direction.

In accordance with another aspect of the disclosure, the second cable can be selectively activated via wrapping engagement about an arcuate surface of the second cam surface while the first cable remains deactivated and substantially unwrapped from the first cam surface while the common gear is rotated in the second direction.

In accordance with another aspect of the disclosure, a latch system for a hood of a vehicle is provided. The latch system includes latch assembly having a ratchet configured for pivoting movement between a primary closed position, a secondary closed position and an open position, wherein the ratchet is biased toward the open position; a pawl configured for operable communication with a power actuator of the latch system via a first cable and being configured for pivoting movement between a primary locking position, a secondary locking position and an unlocking position; and a cinch lever configured for operable communication with the power actuator via a second cable and being configured for pivoting movement between a released, uncinched position and an actuated, cinched position in response to movement of the second cable via selective actuation of the power actuator, the cinch lever being biased toward the released position. With the ratchet in the primary closed position, movement of the first cable in response to a first selective actuation of the power actuator causes the pawl to pivot from the primary locking position to the secondary locking position, which causes the ratchet to move from the primary closed position to the secondary closed position, whereupon movement of the first cable in response to a subsequent second selective actuation of the power actuator causes the pawl to pivot from the secondary locking position to the unlocking position, whereupon the ratchet moves from the secondary closed position to the open position. Upon return of the ratchet to the secondary closed position, movement of the second cable in response to a selective actuation of the power actuator causes the cinch lever to pivot from the released, uncinched position to the actuated, cinched position to pivot the ratchet from the secondary lock position to the primary lock position.

In accordance with another aspect of the disclosure, a latch system for a hood of a vehicle is provided. The latch system includes a latch assembly having a ratchet configured for pivoting movement between a primary closed position, a secondary closed position and an open position, wherein the ratchet is biased toward the open position; a primary pawl configured for operable communication with a power actuator of the latch system via a first cable and being configured for pivoting movement between a primary locking position and a primary unlocking position in response to movement of the first cable via selective actuation of the power actuator, the primary pawl being biased toward the primary locking position; a secondary pawl configured for pivoting movement between a secondary locking position and a secondary unlocking position, the secondary pawl being biased toward the secondary locking position; a coupling lever pivotably mounted to the secondary pawl for movement between an engaged position, a disengaged position, and a home position between the engaged and disengaged positions, the coupling lever being biased toward the engaged position; and a cinch lever configured for operable communication with the power actuator via a second cable and being configured for pivoting movement between a released, uncinched position and an actuated, cinched position in response to movement of the second cable via selective actuation of the power actuator, the cinch lever being biased toward the released position. With the coupling lever in the home position and the ratchet in the primary closed position, movement of the first cable in response to a first selective actuation of the power actuator causes the primary pawl to pivot from the primary locking position to the primary unlocking position, which causes the ratchet to move from the primary closed position to the secondary closed position and the coupling lever to move from the home position to the engaged position, whereupon movement of the first cable in response to a subsequent second selective actuation of the power actuator pivots the primary pawl, wherein the primary pawl engages and moves the coupling lever causing the secondary pawl to pivot from the secondary locking position to the secondary unlocking position, whereupon the ratchet moves from the secondary closed position to the open position. Upon return of the ratchet to the secondary closed position, movement of the second cable in response to a selective actuation of the power actuator causes the cinch lever to pivot from the released, uncinched position to the actuated, cinched position to pivot the ratchet from the secondary lock position to the primary lock position.

In accordance with another aspect of the disclosure, a power actuator for actuating a pair of separate mechanically driven members of a motor vehicle component is provided. The power actuator includes a motor with a drive gear configured in operable communication with the motor to be selectively driven in opposite directions. A common gear is configured in operable communication with the drive gear to be selectively driven from a home position in opposite directions in response to movement of the drive gear. A first drive member is attached to the common gear with a first cable extending between the first drive member and one of the pair of separate mechanically driven members. A second drive member is attached to the common gear with a second cable extending between the second drive member and the other of the pair of separate mechanically driven members, wherein the second cable has a lost motion connection with the second drive member such that the second cable and the common gear can move relative with one another as the common gear rotates from the home position.

In accordance with another aspect of the disclosure, the first drive member of the power actuator can be formed as separate piece of material from the common gear, wherein the first drive member can move relative to the common gear, and the second drive member is fixed against relative movement with the common gear.

In accordance with another aspect of the disclosure, the second drive member of the power actuator can be formed as a monolithic piece of material with the common gear.

In accordance with another aspect of the disclosure, the common gear of the power actuator can be provided having a drive lug and the first drive member can be provided having a driven lug, the drive lug being configured for driving engagement with the driven lug.

In accordance with another aspect of the disclosure, the driven lug can be biased into engagement with the drive lug by a biasing member.

In accordance with another aspect of the disclosure, the first drive member can be provided having a first cam surface configured for engagement with the first cable and the second drive member can be provided having a second cam surface configured for engagement with the second cable.

In accordance with another aspect of the disclosure, the first cam surface and the second cam surface are spaced from one another.

In accordance with another aspect of the disclosure, the first cam surface can be provided having a first geometric contour about which the first cable is configured to wrap and the second cam surface can be provided having a second geometric contour about which the second cable is configured to wrap, the first contour and the second contour can be formed being different from one another.

In accordance with another aspect of the disclosure, a method of actuating a pair of separate mechanically driven members with a power actuator having a single motor is provided.

In accordance with another aspect of the disclosure, the method can include energizing the motor to rotate a common gear in a first direction to rotate a first drive pulley associated with a first cable operably connected to a first mechanically driven member and energizing the motor to rotate the common gear in a second direction, opposite the first direction, to rotate a second drive pulley associated with a second cable operably connected to a second mechanically driven member.

In accordance with another aspect of the disclosure, the method can include regulating energization and de-energization of the motor via a sensor configured to detect the relative position of at least one of the common gear, first drive pulley, and/or second drive pulley.

In accordance with another aspect of the disclosure, the method can include providing a lost motion connection between at least one of the first cable and the first drive pulley and the second cable and the second drive pulley.

In accordance with another aspect of the disclosure, the method can include causing the first cable and the second cable to be driven over different distances while the common gear is rotated over the same number of degrees from a home position.

In accordance with another aspect of the disclosure, the method can include providing a radii and/or geometric shape of the first cam surface and the second cam surface being different from one another to provide the desired drive torque and movement of the respective first cable and second cable as the common gear is rotated.

In accordance with another aspect of the disclosure, the method can include providing the pair of separate mechanically driven members as being members of at least one of a latch for a vehicle closure member and a presenter for a vehicle closure member.

In accordance with another aspect of the disclosure, the method can include providing the pair of separate mechanically driven members as being a pawl and a cinch lever of a latch.

BRIEF DESCRIPTION OF THE DRAWINGS

Other features, aspects and advantages of the present disclosure will be readily appreciated, as the same becomes better understood by reference to the following detailed description when considered in connection with the accompanying drawings wherein:

FIG. 2A is a side view of the power actuator shown connected to a double pull latch assembly associated with the vehicle shown in FIG. 1, with the power actuator shown in a home position and a ratchet in a primary closed position to maintain the double pull latch assembly in a fully latched position;

FIG. 2B is a side view of the double pull latch assembly of FIG. 2A with a cinch lever removed therefrom;

FIG. 2C is a chart illustrating the state and position of the power actuator and double pull latch assembly corresponding to FIG. 2A;

FIGS. 3A-3C are views similar to FIGS. 2A-2C with the power actuator shown being moved in a release direction during a first actuation and a primary pawl of the double pull latch assembly shown being moved to a primary unlocking position;

FIGS. 4A-4C are views similar to FIGS. 3A-3C with the power actuator shown being returned to the home position and a secondary pawl of the double pull latch assembly shown being moved to a secondary locking position to retain the ratchet in a secondary closed position;

FIGS. 5A-5C are views similar to FIGS. 4A-4C with the power actuator shown being moved in a released direction during a second actuation and the secondary pawl of the double pull latch assembly shown being moved to a secondary unlocking position to allow the ratchet to move to an open position;

FIGS. 6A-6C are views similar to FIGS. 5A-5C with the power actuator shown being returned to the home position and the secondary pawl of the double pull latch assembly shown in the secondary unlocking position to allow the ratchet to move to the open position;

FIGS. 7A-7C are views similar to FIGS. 6A-6C with the power actuator shown in the home position, the ratchet in the open position and the double pull latch assembly in a fully open, unlatched position;

FIGS. 8A-8C are views similar to FIGS. 4A-4C with the power actuator shown in the home position and the secondary pawl of the double pull latch assembly shown in the secondary locking position to retain the ratchet in the secondary closed position;

FIGS. 9A-9C are views similar to FIGS. 8A-8C with the power actuator shown being moved in a cinching direction, opposite the release direction, with a cinch lever of the double pull latch assembly shown being moved to a cinched position and the ratchet shown being moved to the primary closed position;

FIGS. 10A-10C are views similar to FIGS. 9A-9C with the power actuator shown being returned to the home position and with the double pull latch assembly shown in the fully latched position;

and

Figure 18:
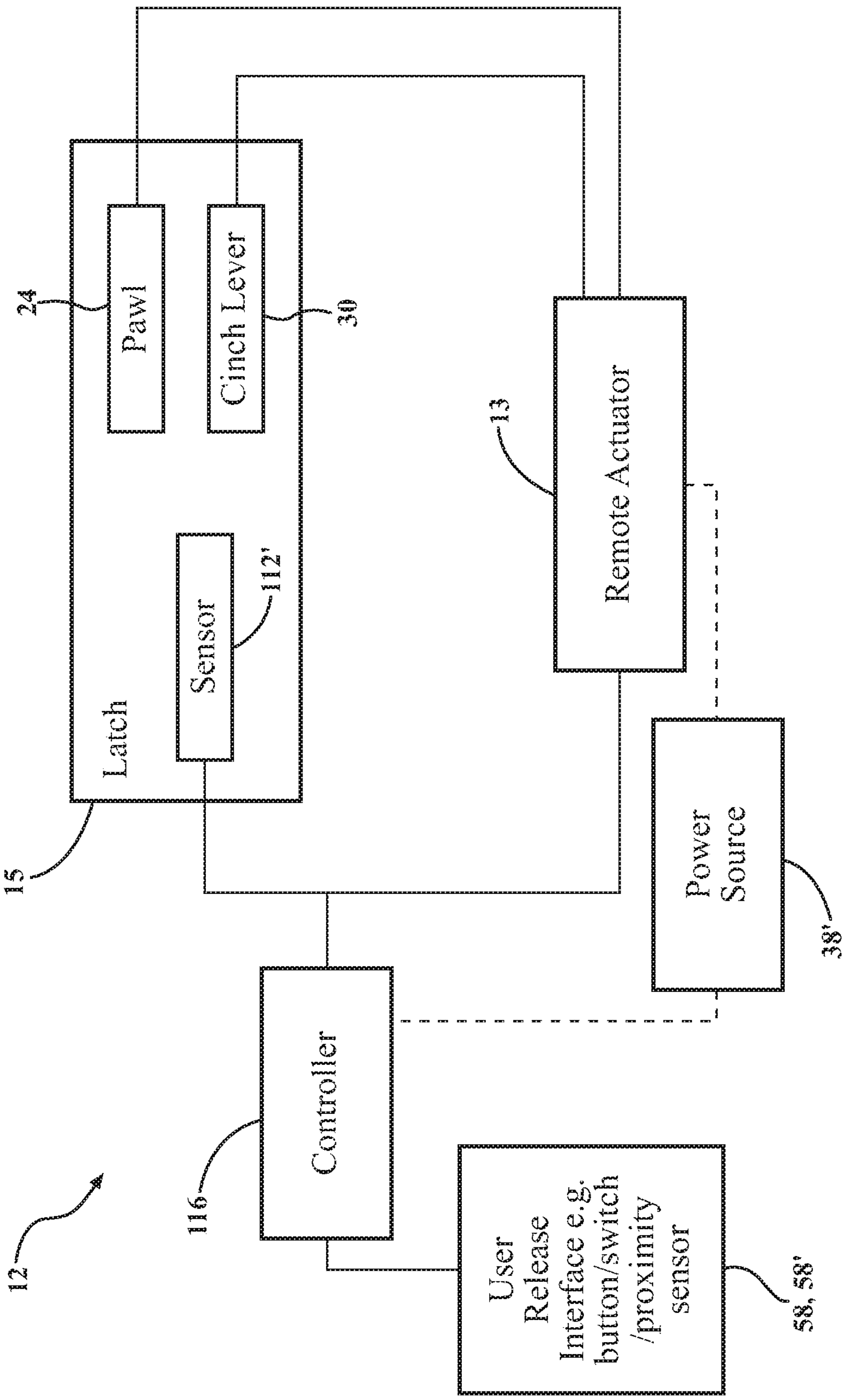

FIG. 18 is a flow diagram illustrating a system including an actuation mechanism for use with one or more power-actuated mechanisms in accordance with another aspect of the disclosure.

DETAILED DESCRIPTION OF EXAMPLE EMBODIMENTS

In general, example embodiments of power actuators having a dual cable actuating mechanism constructed in accordance with the teachings of the present disclosure and mechanically actuatable components operably coupled thereto for selective and independent mechanical actuation via cables of the dual cable actuating mechanism will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1:
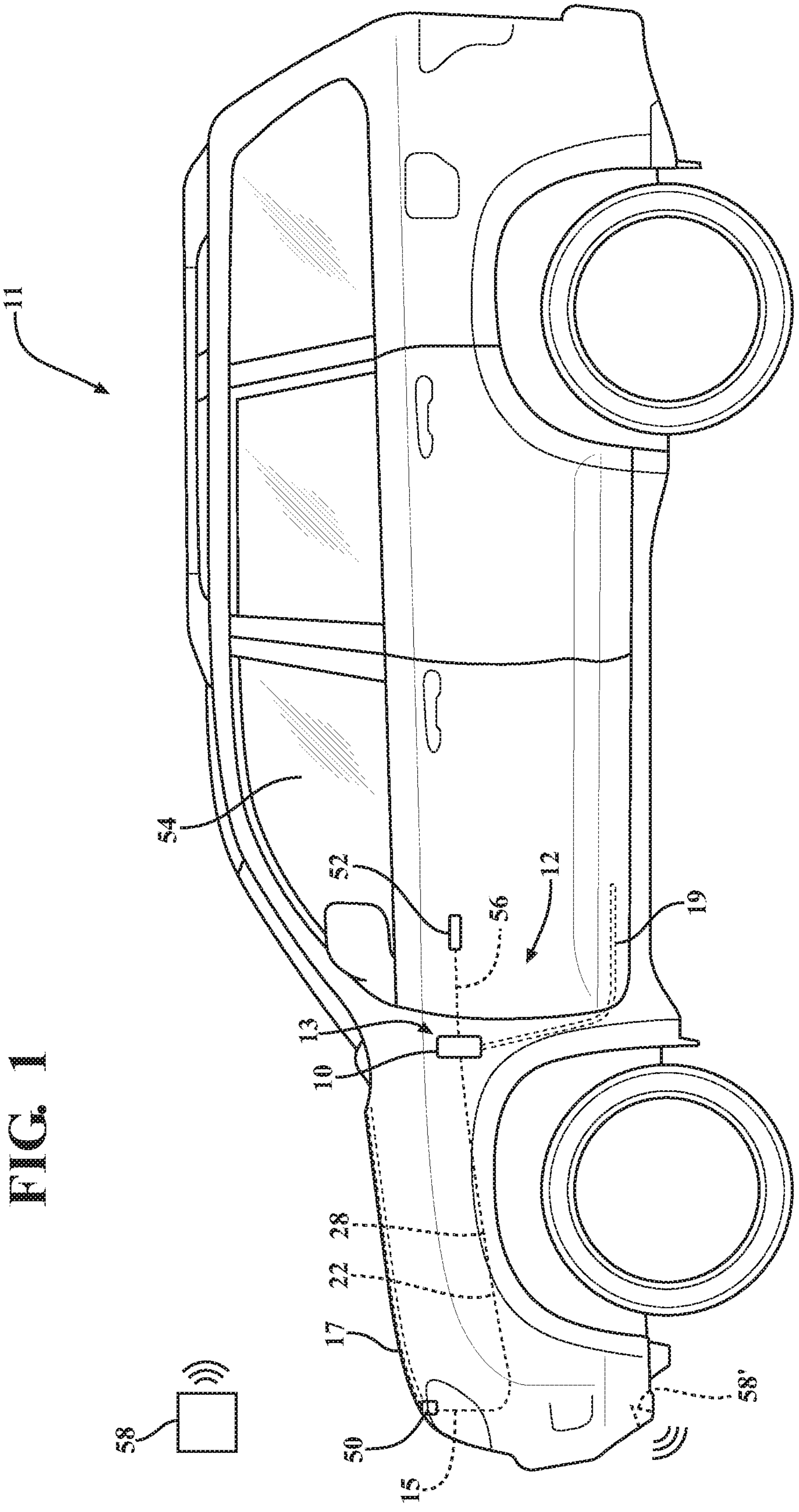
FIG. 1 is a side view of a vehicle including a power actuator having a dual cable actuation mechanism for use with a power-actuated mechanism of a vehicular closure panel in accordance with the disclosure.
Figure 11:
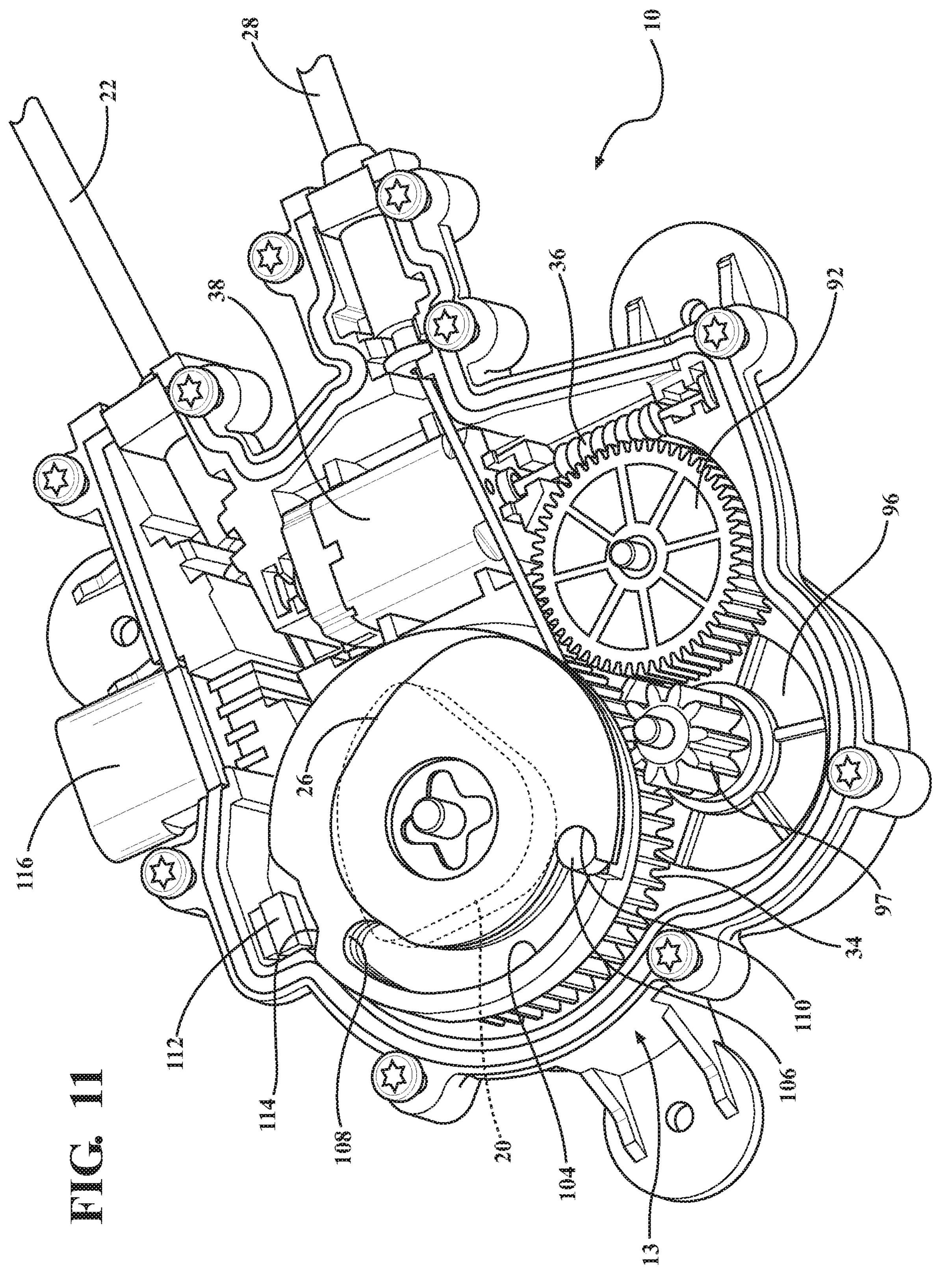
FIG. 11 is a perspective view of the power actuator shown with a cover removed.
Figure 11A:
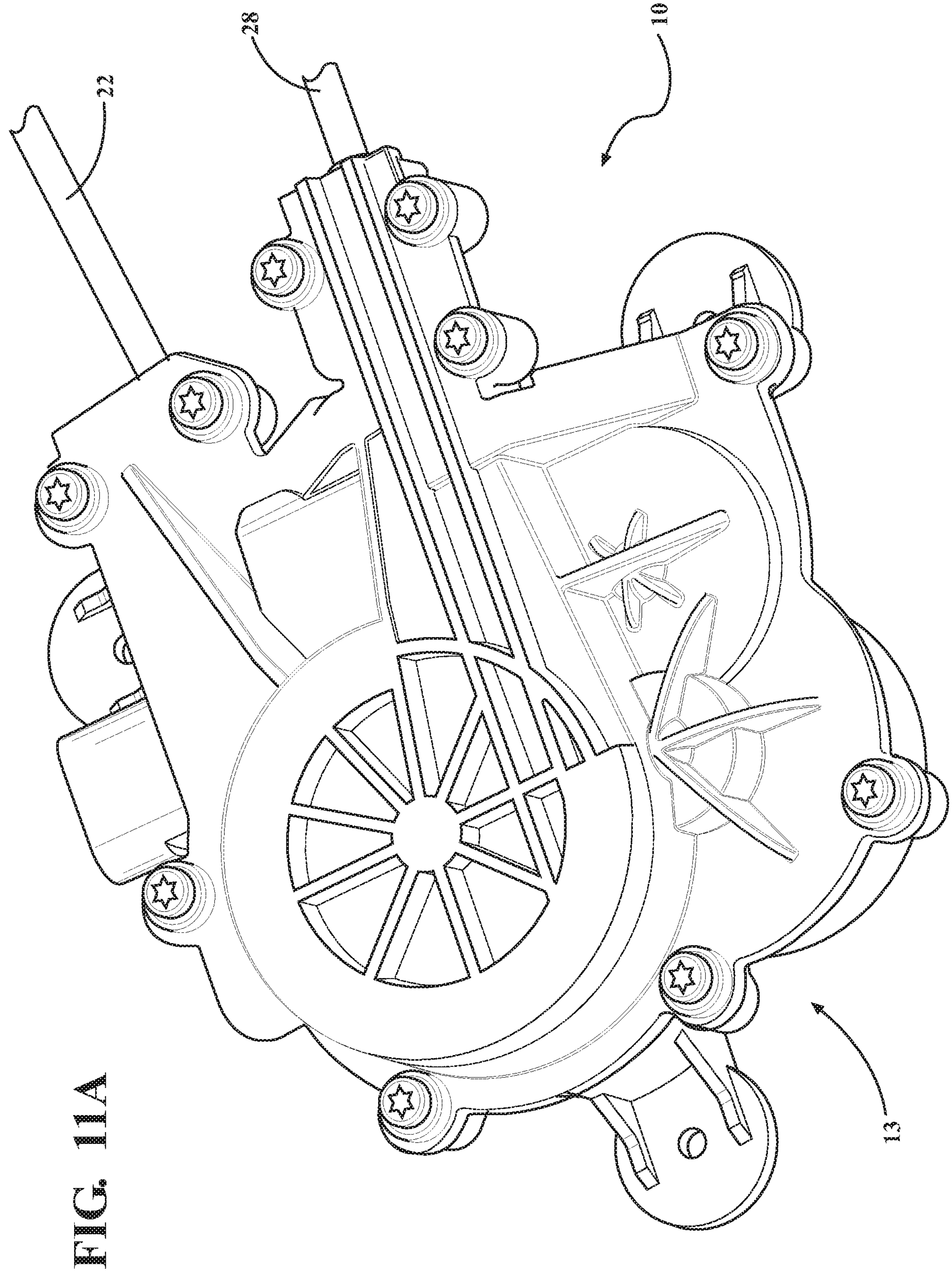
FIG. 11A is a view similar to FIG. 11 with the cover assembled.
Figure 15A:
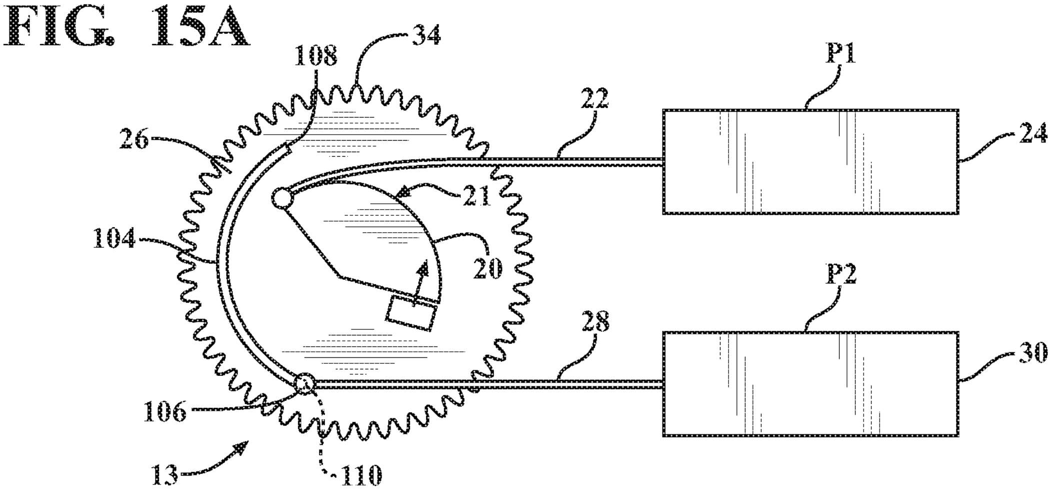
FIG. 15A is a schematic side view illustrating the first and second cables of the power actuator operably coupled to respective first and second moveable parts, with the power actuator shown in a home, at rest position.
Figure 15B:
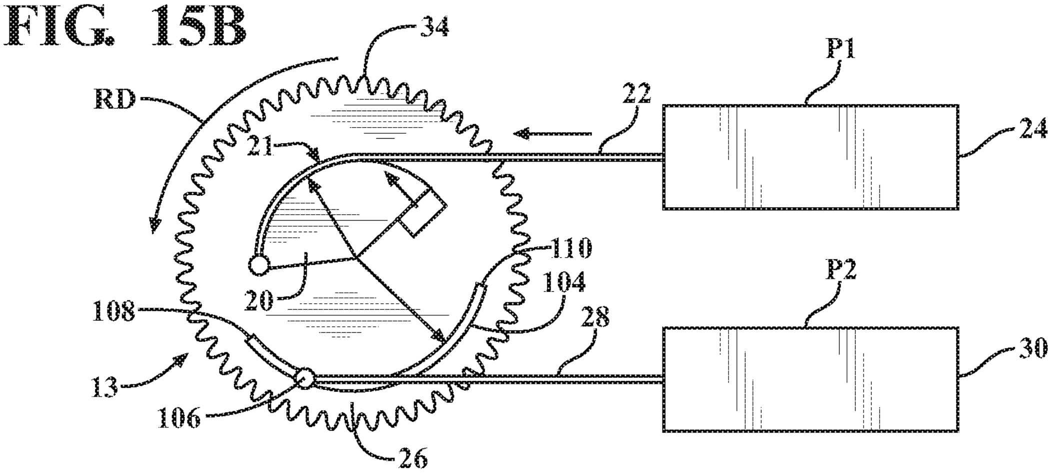
FIG. 15B is a view similar to FIG. 15A showing the power actuator being actuated to cause movement of the first moveable part.
Figure 15C:
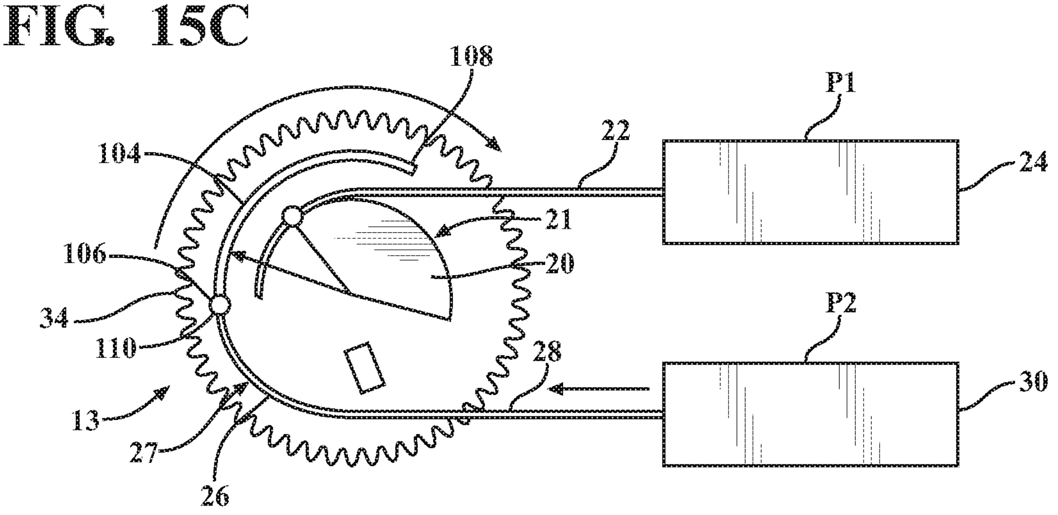
FIG. 15C is a view similar to FIG. 15A showing the power actuator being actuated to cause movement of the second moveable part.
Figure 16:
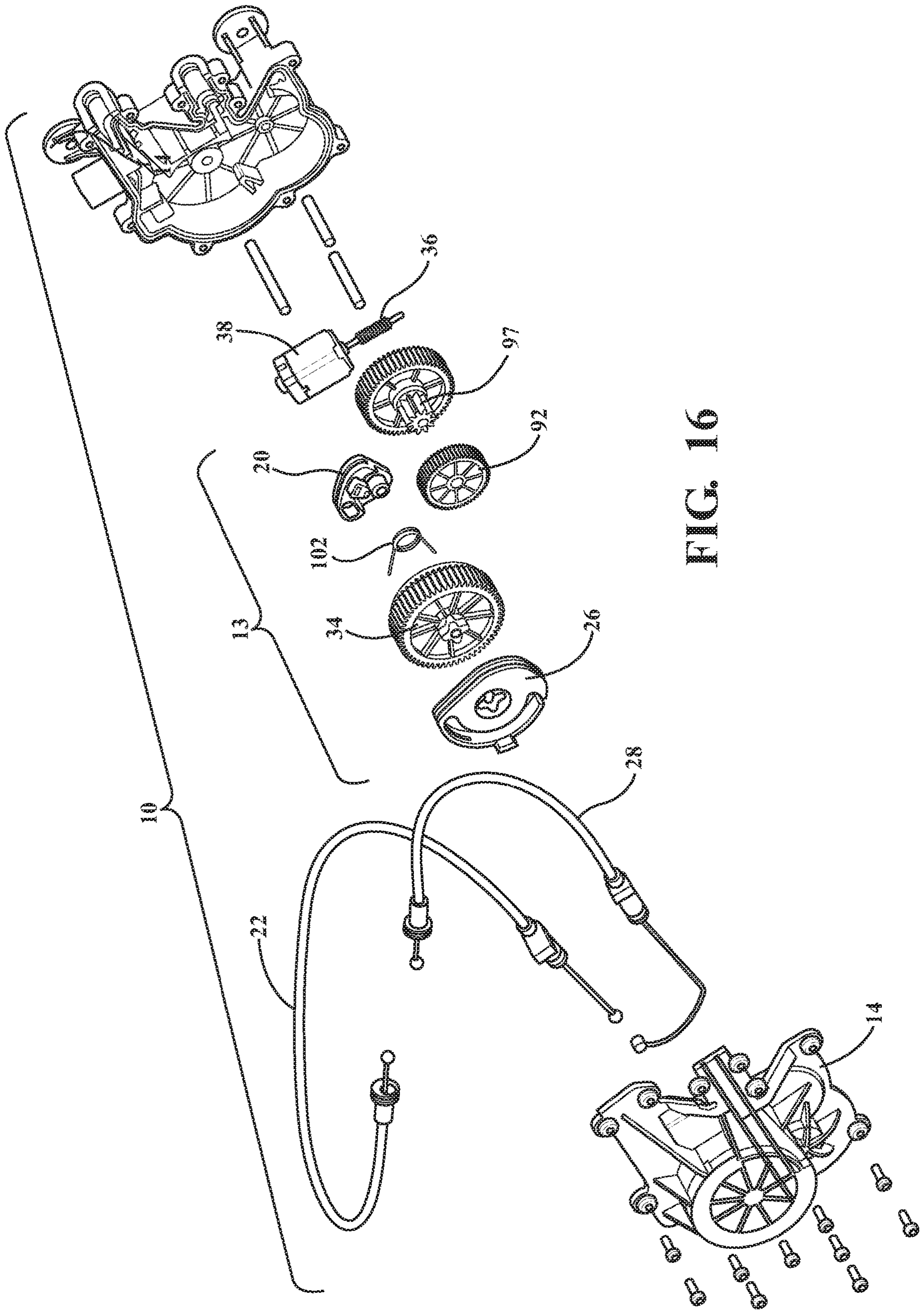
FIG. 16 is an exploded view of a power actuator in accordance with an aspect of the disclosure.

Reference is made to FIG. 1, which shows a motor vehicle 11 that has a power actuator 10 having a dual cable actuation mechanism 13 for use with one or more power-actuated mechanisms to form a system 12 having movable parts P1, P2 (FIGS. 15A-15C) via mechanical actuation, such as a power-actuated latch 15 of a power actuated latch system 12 used for selective operation of a vehicular closure panel, such as a front hood 17, by way of example and without limitation, and/or a power-actuated presenter 19 used for selective operation of a vehicular closure panel, such as a door, shown as a swing door 19, by way of example and without limitation. Another latch suitable for use with power actuator 10 is described in co-owned U.S. Publication No. 2019/0338568 A1 (referred to hereafter as the "'568 publication"), filed on May 3, 2019 and published on Nov. 7, 2019, the entire contents of which is incorporated herein by way of reference. Power actuator 10 may be used for controlling other vehicle systems, such as an actuated presentable door handle, actuatable side rear view mirrors, multiple latch systems, multiple cinching systems, for sliding door latching/cinching systems, without limitation. As shown in FIG. 1, the dual cable actuation mechanism 13 may be provided as a separate remote unit from the latch 15 in a separate housing 14 (FIG. 16), and in other words the dual cable actuation mechanism 13 and the latch 15 each having separate support structure or frames and fasteners coupling the support or frame for mounting to the body of the vehicle 11. However, in some configurations it is possible for the dual cable actuation mechanism 13 and the latch 15 to share a common supporting structure, also referred to as common housing or frame which is in turn mountable to the body of the vehicle 11. The closure panel may be configured for use with a front trunk, or also referred to as a frunk. A frunk is a forward compartment of the vehicle normally occupied by a gas engine, however in the configuration where an engine is not provided within such a compartment (for example rather provided in the rear of the vehicle, or in the configuration of an electrical vehicle where the electric motor may be provide at other locations or below the compartment), such a compartment is converted for use as storage for items such as luggage, groceries, and the like normally stored in a rear trunk requiring higher frequency access by a user as compared to the lower access frequency for servicing an engine. Therefore power-actuated latch 15 may be a frunk power-operated latch for providing desirable power operated high frequency functions as described herein, such as power release and cinch functions. The dual cable actuation mechanism 13 includes a first drive member, shown and also referred to as a first drive pulley 20, having a first cam surface 21 configured to drive a first rod or cable 22 in operable communication with a first driven member 24, such as a pawl 24 of latch 15, by way of example and without limitation, and a second drive member, shown and also referred to as a second drive pulley 26, having a second cam surface 27 configured to drive a second rod or cable 28 in operable communication with a second driven member 30, such as a cinch lever 30, by way of example and without limitation. The first drive member 20 and second drive member 26 are shown supported for rotation about a common axis A1 of a common shaft, also referred to as pin or axle 32. In the exemplary embodiment illustrated, the first drive member 20 and second drive member 26 are shown as being constructed of separated pieces of material (plastic and/or metal) from one another, wherein one of the members 20, 26, shown as the second drive member 26, can be formed as a monolithic piece of material with a driven gear, also referred to as common driven gear or common gear 34, if desired, or otherwise, the first and second drive members 20, 26 can be coupled to common gear 34 for rotation therewith. Common gear 34 is configured in operable driven communication with a drive gear 36 of a powered motor 38, whereupon common gear 34 can be selectively rotated via selective actuation of motor 38. Motor 38 is selectively actuatable to rotate drive gear 36 in opposite clockwise and counterclockwise directions, as discussed hereafter, to effect the desired direction of rotation of first drive member 20 and second drive member 26, thereby being able to move first cable 22 and second cable 28 as desired to actuate first driven member 24 and second driven member 30, respectively. As such, two different mechanically actuatable first and second driven members 24, 30, such as pawl 24 and cinch lever 30, can be selectively actuated via the same motor 38 of a single power actuator 10 at different times and separately from one another, depending on the direction of rotation of motor 38. Accordingly, manufacture, assembly, space, inventory cost savings and efficiencies, among other things, which will be recognized by a person possessing ordinary skill in the art, can be recognized by only having to incorporate a single power actuator 10 for operating multiple mechanically actuatable components.

Referring to FIGS. 2A-2B through 10A-10B, in accordance with one aspect, the latch 15 can include a ratchet 40, the first driven member, shown as a primary pawl 24, a secondary pawl 42, a coupling link, also referred to as coupling lever 44, and a housing 46. The ratchet 40 is pivotably connected to the housing 46 and is movable between a primary closed position (FIGS. 2A-2B, 9A-10B), a secondary closed position (FIGS. 4A-4B and 8A-8B) and an open position (FIGS. 6A-7B) in response to selective coordinated movement of the primary and secondary pawls 24, 42, as discussed further hereafter. The pivotal movement of the ratchet 40 may take place about a pin 48 that can be mounted to the housing 46. In the primary and secondary closed positions, the ratchet 40 prevents the withdrawal of a striker 50 that is mounted to the vehicle hood 17 and/or some other closure panel having latch 15. When in the primary closed position, the ratchet 40 holds the striker 50 relatively deeper within a slot, commonly referred to fishmouth (not shown, but well-known in the art), of the housing 46, whereat the hood 17 is in a fully closed state, as compared to when ratchet 40 is in the secondary closed position, whereat the hood 17 is in a partially closed state, but prevented from being moved to the fully open position by ratchet 40. Thus, in the primary closed position the ratchet 40 holds the striker 50 at a first depth in the fishmouth, and in the secondary closed position the ratchet 40 holds the striker 50 at a second depth in the fishmouth of the housing 46, wherein the first depth is greater than the second depth.

An actuation device 52, such as a button, lever, rotatable knob or otherwise, located within a passenger compartment 54 of motor vehicle 11 is in operable communication with the primary pawl 24 via power actuator 10, such as via an electrical member 56 that operably interconnects the actuation device 52 with the power actuator 10. A controller, such as controller 116, may be provided as part of the power actuator 10, as part of latch 15, or as a standalone controller unit, in which electrical member may be electrically coupled to the latch 15 or standalone controller, which includes a further electrical coupling from the latch 15 or standalone controller to the power actuator 10. Other configurations are possible, for example the Body Control Module (BCM) of the vehicle may serve as the controller. A mechanical backup connection may be provided (for example within the vehicle cabin, or under an external panel, or at another access point on the vehicle, or within the compartment (such as a frunk) closed by the closure panel 17. Such a mechanical back up connection may be a lever/handle coupled to the latch 15 (e.g. coupled to coupling lever 44 as will be described herein below) for providing emergency or servicing control of latch 15, that is the direct movement of coupling lever 44, as shown schematically in FIG. 1 and in the '568 publication, moves the primary pawl 24 and/or secondary pawl 42. For example when the latch 15 is in the primary locked state, a single movement of the coupling lever 44 may act to move both the primary pawl 24 and the secondary pawl 42 for transitioning the latch 15 to its unlocked open state with one actuation. The power actuator 10 is in turn operably connected to latch 15 via connection of the first cable 22 with the first driven member (primary pawl 24) and via connection of the second cable 28 with the second driven member (cinch lever 30). It is to be recognized that other actuation devices can be configured for operable communication with power actuator 10 to selectively actuate power actuator 10 and cause movement of primary pawl 24 via first cable 22 and cinch lever 30 via second cable 28, such as via a non-contact external interface, including an electronic key fob 58 and/or sensor 58' emitting a radar field adjacent the closure panel 17 to facilitate opening closure panel 17 in a hands-free operation, or other electrically actuatable device/member.

The primary pawl 24 is shown being supported for respective pivotal movement about a pin 60. Primary pawl 24 has a primary locking surface 62, a stop surface 64 and a drive surface 66 extending outwardly from stop surface 64. Primary pawl 24 is biased toward the primary locking position via any suitable biasing member, such as a spring member, shown schematically in FIG. 2A at arrow 67.

Secondary pawl 42 has a secondary locking surface 68 biased into abutment with ratchet 40 via any suitable biasing member, such as a spring member, shown schematically in FIG. 2B at arrow 69, by way of example and without limitation. A pin 70 extends laterally outwardly from a generally planar surface of the secondary pawl 42, wherein pin 70 supports coupling lever 44 for pivotal movement thereon. Pivotal movement of the secondary pawl 42 may take place about a pin 72 that can be mounted to the housing 46.

The ratchet 40 is biased toward the open position by a ratchet biasing member, such as via any suitable coil or torsion spring member, by way of example and without limitation, shown schematically by arrow 74 (FIG. 2A). Ratchet 40 has a primary locking surface 76 configured for selective releasably locked engagement with primary locking surface 62 of primary pawl 24 and a secondary locking surface 78 configured for selective releasably locked engagement with secondary locking surface 68 of secondary pawl 42. Ratchet 40 has a slot 79 configured for receipt of striker 50 therein while in the primary and secondary closed positions, as is known. To facilitate maintaining the ratchet 40 in the secondary closed position, until desired to move ratchet 40 to the fully open position, a hook-shaped nose 80 is provided at an exit region of the slot 79. Ratchet 40 has an elongate, arcuate arm 82 extending away from slot 79 into generally underlying relation with pin 48. Arm 82 has a peripheral outer holding surface 83 contoured for selective abutment with a shoulder 84 of coupling lever 44 to selectively maintain coupling lever 44 in a home position while latch 15 is fully latched with ratchet 40 in its primary closed position.

The coupling lever 44 is pivotably mounted to the secondary pawl 42 via pin 70 for movement between a disengaged position, also referred to as home position (FIGS. 2A-3B) and a connected position, also referred to as an engaged position (FIGS. 4A-8B). The coupling lever 44 is biased toward the engaged position by any suitable biasing member, and is shown as being biased schematically in the direction of arrow 86 (FIG. 2B). Coupling lever 44 extends from pin 70 to a generally hook-shaped portion 88 that terminates at a free end 89. In use, in a normal release condition, with the coupling lever 44 in the home position and the ratchet 40 in the primary closed position (FIGS. 2A-2B), movement of the primary pawl 24 from the primary locking position to the primary unlocking position (FIGS. 3A-4B) in response to a first actuation of the release member (actuation device 52) causes the ratchet 40 to move from the primary closed position to the secondary closed position. During movement of the ratchet 40 to the secondary closed position, the holding surface 83 of ratchet 40 slides along shoulder 84 of coupling lever 44 and ultimately moves out of contact with shoulder 84, whereupon the coupling lever 44 is automatically biased by biasing member 86 to move from the home position to the engaged position. Upon the primary locking surface 62 of primary pawl 24 moving out from engagement from primary locking surface 76 of ratchet 40, the biasing member 74 biases ratchet 40 to the secondary closed position, whereat secondary locking surface 68 of secondary pawl 42 engages secondary locking surface 78 of ratchet 40 to releasably maintain the ratchet 40 in the secondary closed position. Upon performing a first actuation of primary pawl 24, primary pawl 24 is biased by biasing member 67 to return to its home primary locking position whereupon stop surface 64 confronts and abuts free end 89 of coupling lever 44, thereby holding the coupling lever 44 in the engaged position (FIGS. 4A-4B). Then, when desired to fully release latch 15, repeated actuation of the primary pawl 24 is performed, such as via a second actuation of actuation device 52 from inside the passenger compartment 54 or via key fob 58, causing movement of the primary pawl 24 to the primary unlocking position in response to a second actuation of the release member, whereupon drive surface 66 of primary pawl 24 engages a region of the coupling lever 44 immediately adjacent free end 89 and moves the coupling lever 44 in translation generally along a direction indicated by arrow 90 (FIG. 5B). With coupling lever 44 move in the direction of arrow 90, the secondary pawl 42 is caused to pivot about pin 72 out from the secondary locking position to the secondary unlocking position, whereupon secondary locking surfaces 68, 78 move out of engagement from one another, whereupon ratchet 40 is caused to move under the bias of biasing member 74 from the secondary closed position to the open position (FIGS. 6A-7B). At this time, hood 17 may be moved to a fully open position.

Accordingly, in use, when desired to unlock the latch 15, the actuation device 52 can be selectively actuated in a first actuation to energize motor 38, whereupon motor 38 rotates drive gear 36, illustrated as a worm gear, by way of example and without limitation, in a first direction (clockwise or counterclockwise), whereupon drive gear 36 causes common gear 34 to be rotated in a release direction indicated by arrow RD in FIG. 3A. In the embodiment illustrated, a first intermediate gear 92 has teeth 93 in meshed engagement with drive gear 36 and teeth 95 (hidden) in meshed engagement with teeth 94 of a second intermediate gear 96. Second intermediate gear 96 has teeth 97 in meshed engagement with teeth 35 of common gear 34. It is to be recognized that the respective number of teeth and diameters of first and second intermediate gears 92, 96 can be selected as desired to provide the desire drive ratios therebetween.

Figure 12A:
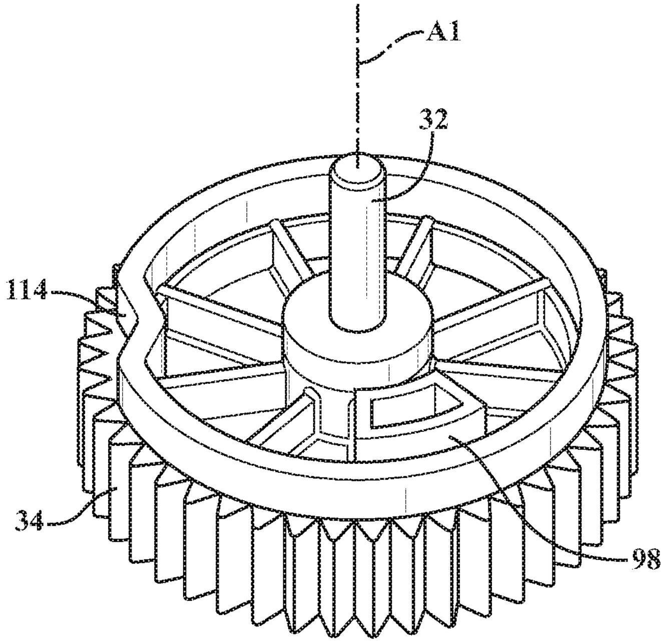
FIGS. 12A and 12B are opposite side perspective views of a common gear of the power actuator.
Figure 12B:
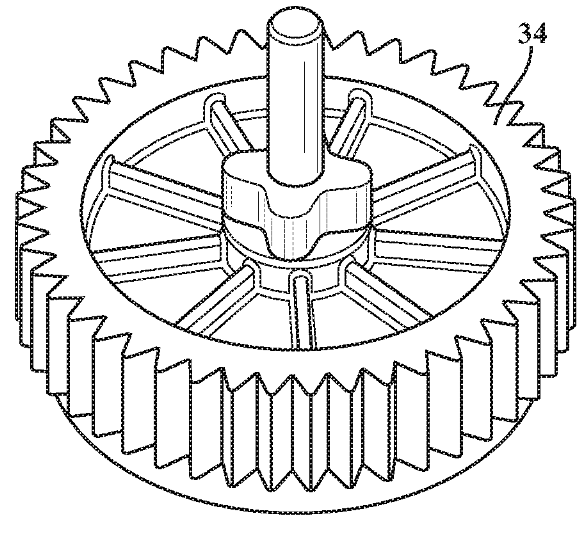
Figure 13B:
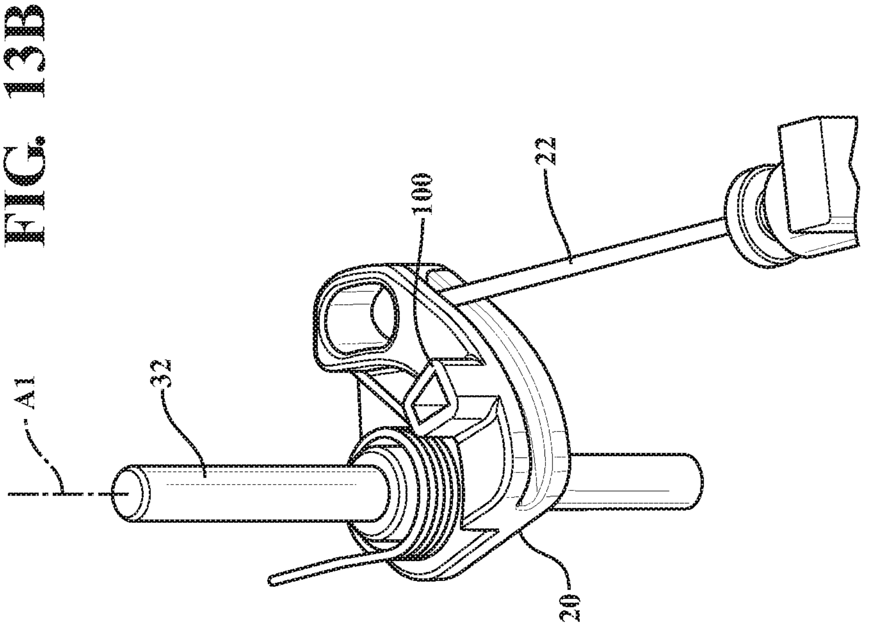
FIGS. 13A and 13B are opposite side perspective views of a first drive pulley of the power actuator shown with a first cable connected thereto.
Figure 13A:
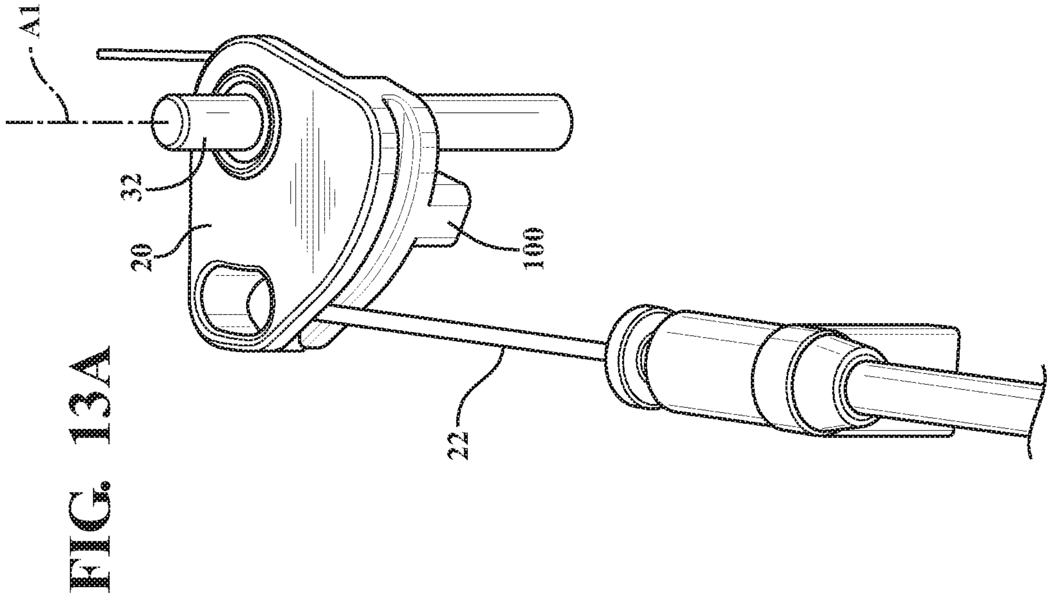
Figure 14B:
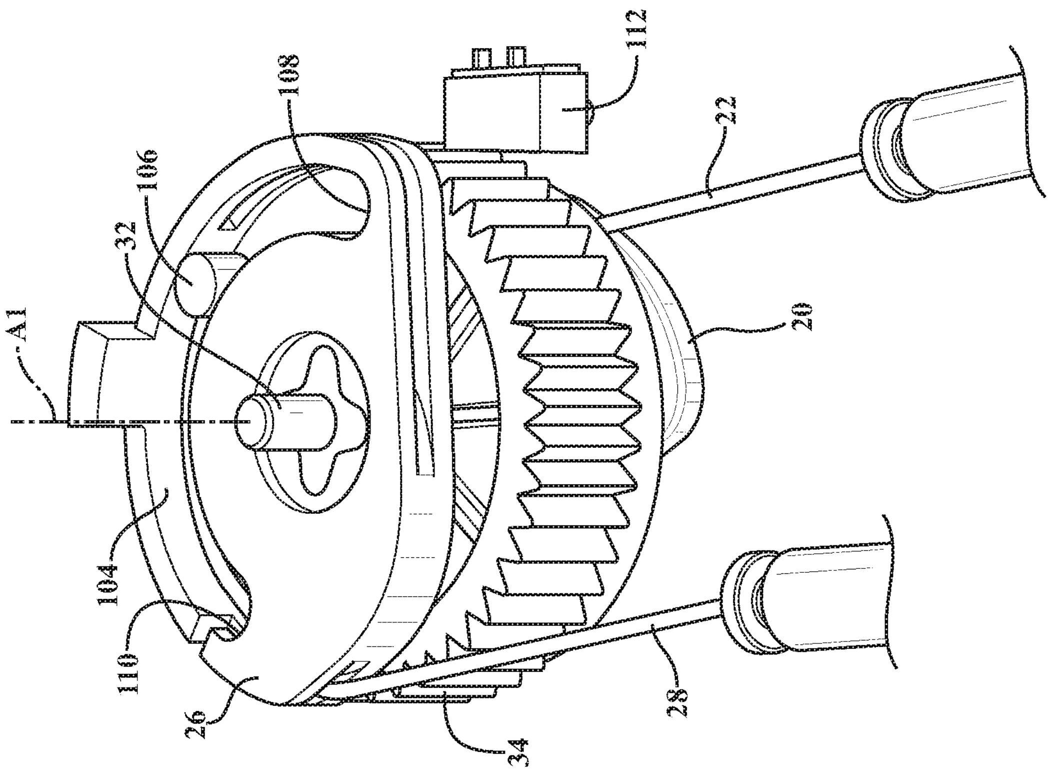
FIGS. 14A and 14B are opposite side perspective views of the common gear of FIGS. 12A and 12B showing the first drive pulley and a second drive pulley fixed to opposite sides of the common gear with the first cable shown connected to the first drive pulley and a second cable shown connected to the second drive pulley.
Figure 14A:
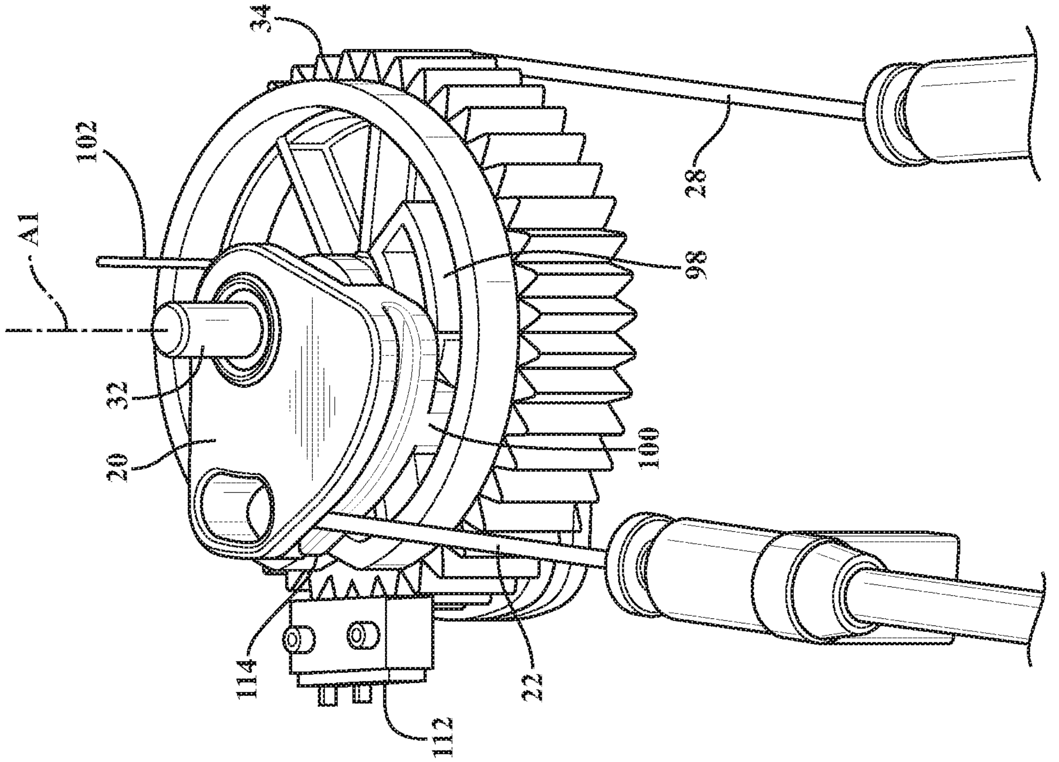

As common gear 34 is driven in the release direction RD during the first actuation, as shown in FIG. 3A, a drive lug 98 (FIGS. 12A, 14A) of common gear 34 drives a driven lug 100 (FIGS. 13A-14A) of first drive member 20, thereby causing first drive member 20 to rotate about axis A1 conjointly with common gear 34 (shown as being rotated in a counterclockwise direction in FIG. 3A) against a bias of a biasing member, such as a torsion spring 102 (FIGS. 13A-14A). As first drive member 20 is caused to rotate about axis A1, the first cable 22 is pulled via direct, fixedly coupled attachment with first drive member 20, whereupon first cable 22 is caused to wrap about the first cam surface 21, thereby acting to pull primary locking surface 62 of primary pawl 24 out from locking engagement with primary locking surface 76 of ratchet 40, thus allowing ratchet 40 to move under the bias of biasing member 74 to the secondary locking position, whereat secondary locking surface 68 of secondary pawl 42 is brought into locking engagement with secondary locking surface 78 of ratchet 40 (FIG. 4B). While performing the first actuation, as first cable 22 is being pulled and wrapped about first cam surface 21, the second cable 28 remains at rest or substantially at rest initially due to a lost motion connection between second cable 28 and second drive member 26. The lost motion connection is provided via an elongate, arcuate slot 104 extending into a sidewall of second drive member 26 along a circumferential direction of second drive member 26 about axis A1 and sliding receipt of a connector fitting 106 fixed to end of second cable 28 therein. The connector fitting 106 is provided to retain second cable 28 in fixedly coupled relation with second drive member 26, but is sized to slide translateably within slot 104 between opposite ends 108, 110 of slot 104. Upon movement of secondary pawl 42 to the secondary locking position, the coupling lever 44 is caused to move to the engaged position, thereby pulling on second cable 22 and causing connector fitting 106 to slide within slot 104, as shown between FIGS. 3A and 4A.

Upon releasing primary pawl 24 from the primary locking position and bringing secondary pawl 42 into the secondary locking position, motor 38 automatically reverses direction of rotation of drive gear 36 in a second direction opposite the first direction to rotate common gear 34 in a home direction about axis A1 illustrated by arrow HD, as shown in FIG. 4A. As common gear 34 rotates in the home direction HD, a drive lug 98 of common gear 34 and the bias of a biasing member 102 allows first drive member 20 to rotate about axis A1 back to the home position (FIGS. 2A, 4A), whereupon the first cable 22 is caused to unwrap from the first cam surface 21. At this time, latch 15 is in the secondary lock position, such that hood 17 is partially open, but retained from being fully opened by nose 80 or ratchet 40 retaining striker 50. To facilitate the return of common gear 34 and first drive member 20 to the home position, a sensor 112, configured to detect the relative position of at least one of the common gear 34, first drive member 20, and/or second drive member 26, shown by way of example and without limitation as being a home indicator feature, such as a protrusion or notch 114, extending into an outer periphery of common gear 34, detects home notch 114 and signals motor 38 to be de-engergized. It will be understood by a skilled artisan in the art of position sensors that any mechanical, electrical or electromechanical sensor could be used, as desired, with the sensor 112 being in communication with a controller 116 to signal motor 38 to be selectively power actuated engergized and de-engergized in response to an actuation be sent via actuation device 52 and/or key fob 58, as desired.

While latch 15 is in the secondary lock position, the latch 15 can be acted on again via a second engergization of motor 38 to bring latch to the fully unlatched, unlocked position, similarly as discussed above for the first engergization. Accordingly, actuation device 52 can be selectively actuated to energize motor 38, whereupon motor 38 rotates drive gear 36 in the first direction (counterclockwise, as shown in FIG. 5A), whereupon drive gear 36 causes common gear 34 to be rotated in the release direction RD in FIG. 5A.

As common gear 34 is driven in the release direction RD, as shown in FIG. 5A, drive lug 98 of common gear 34 drives driven lug 100 of first drive member 20, thereby causing first drive member 20 to rotate about axis A1 conjointly with common gear 34 (shown as being rotated in a counterclockwise direction in FIG. 5A) against a bias of biasing member 102. As first drive member 20 is caused to rotate about axis A1, the first cable 22 is pulled by first drive member 20, whereupon first cable 22 is caused to wrap about the first cam surface 21, thereby acting to pull drive surface 66 of primary pawl 24 into abutment with a protrusion adjacent free end 89 of coupling lever 44 and pull coupling lever 44 in the direction of arrow 90, thereby acting to rotate secondary pawl 42 in a clockwise direction, as viewed in FIG. 5B, and pull secondary locking surface 68 out from locking engagement with secondary locking surface 78 of ratchet 40, thus allowing ratchet 40 to move under the bias of biasing member 74 to the open position (FIGS. 5A-7B). Again, as discussed above for the first actuation, the second cable 28 remains at rest or substantially at rest (minimal to no translational movement) as a result of the lost motion connection and ability of connector fitting 106 to slide freely with slot 104 between opposite ends 108, 110 of slot 104, as shown. Upon release of secondary pawl 42, motor 38 again automatically reverses direction of rotation of drive gear 36 in the second direction opposite the first direction to rotate common gear 34 back to the home position, as shown in FIG. 6A. At this time, latch 15 is in the fully open position. Therefore a user may select the actuation device 52 only once and a controller, such as controller 116 is programmed control the dual actuation of the motor 38, or in other words perform a double pull of actuation cable 22 for releasing the pawl 24, 42 in sequence to open the latch 15. Actuation device 52 may be provided within the cabin of the vehicle 11, in a location normally associated with a manual hood release handle, provided on the dash of the vehicle 11, or provided externally the vehicle 11 such as part of the grill of the vehicle, integrated in a headlight of the vehicle, or other conveniently accessible location next to the closure panel 17 when a person is external the vehicle 11 and desiring to gain access to the compartment e.g. frunk of the vehicle 11 in a powered operated manner. In a configuration, the actuation device 52 may be provided at multiple locations on the vehicle, both internal and external. In another configuration, the actuation device 52 may be a non-contact proximity sensor such as a ultrasonic, radar, capacitive type sensor for detecting a user's intent to perform a power release of the latch 15, for example as a result of a foot step, or kick or wave, and other motion or non-motion of a body part.

When the latch 15 is in the secondary lock position, such as upon the hood 17 being returned from an open position to the partially closed position, or upon release of the ratchet 40 from the primary closed position to the secondary closed position, the actuation device 52 can be selectively actuated to energize motor 38, for example in response to a controller detecting the primary pawl 24 being moved by the ratchet 40 returning to the secondary closed position under the force of the striker 50 rotating the ratchet 40 when the hood 17 being is returned from an open position towards one of the closed positions, whereupon motor 38 rotates drive gear 36 in the second direction, whereupon drive gear 36 causes common gear 34 to be rotated from the home position in a cinching direction indicated by arrow CD in FIG. 9A, corresponding to the home direction HD.

As common gear 34 is driven in the cinching direction CD, as shown in FIG. 9A, second drive member 26 is caused to rotate about axis A1 conjointly with common gear 34 (shown as being rotated in a clockwise direction in FIG. 9A). As second drive member 26 is caused to rotate about axis A1, the second cable 28 is pulled via coupled attachment and engagement of connector fitting 106 with end 110 of slot 104, thereby causing second cable 28 to wrap about the second cam surface 27, thereby acting to pull and rotate second driven member 30 (cinch lever), whereupon cinch lever 30 drives ratchet 40 and causes ratchet 40 to rotate clockwise, as viewed in FIGS. 9A and 9B. As ratchet 40 is driven in the clockwise direction, striker 50 is driven deeper into slot 79 until the hood 17 is fully closed and the latch 15 is brought into its fully latched position, whereat ratchet 40 is in its primary closed position. It can be seen that during rotation of common gear 34 and second drive member 26, first drive member 20 remains stationary or substantially stationary (little to no movement) due to drive lug 98 rotating away from driven lug 100 and due to biasing member 102 retaining first drive member 20 in against rotation. Upon completing the cinching of ratchet 40, motor 38 automatically reverses direction of rotation of drive gear 36 in the first direction opposite the second direction to rotate common gear 34 back to the home position, whereupon sensor 112 signals motor 38 to be de-engerized and cinch lever 30 is biased to its home, released, uncinched position via a biasing member 31. At this time, latch 15 is in the primary closed position, such that hood 17 is fully closed.

In accordance with a further aspect, it is to be recognized that the first cam surface 21 can be provided having a first geometric radii and/or contour (circular arc, non-circular arc, e.g. parabolic, or otherwise) about which the first cable 22 is configured to wrap and the second cam surface 27 can be provided having a second radii and/or geometric contour (circular arc, non-circular arc, e.g. parabolic, or otherwise) about which the second cable 28 is configured to wrap, wherein the first contour and the second contour can be formed being the same or different from one another, as desired for the intended operation and application. Accordingly, the first cable 22 and the second cable 28 can be driven over different distances from one another, as desired, while the common gear 34 is rotated over the same number of degrees in clockwise and counterclockwise directions from the home position.

Figure 17:
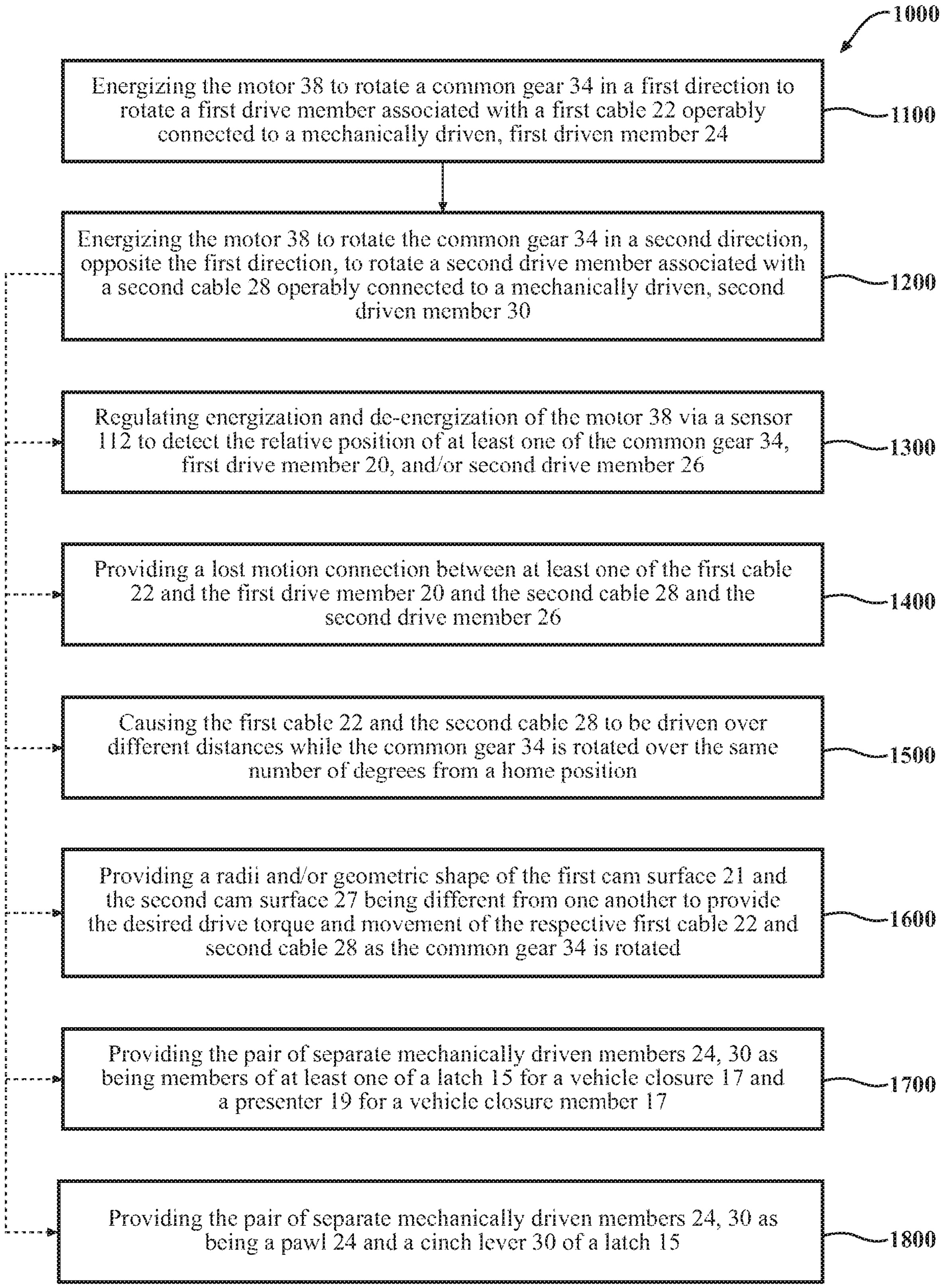
FIG. 17 is a flow diagram illustrating a method of actuating a pair of separate mechanically driven members with a power actuator in accordance with an aspect of the disclosure.

In accordance with another aspect of the disclosure, as shown in FIG. 17, a method 1000 of actuating a pair of separate mechanically driven members 24, 30 with a power actuator 10 having a single motor 38 includes a step 1100 of energizing the motor 38 to rotate a common gear 34 in a first direction to rotate a first drive member, such as a drive pulley 20, associated with a first cable 22 operably connected to a mechanically driven, first driven member 24, and a step 1200 of energizing the motor 38 to rotate the common gear 34 in a second direction, opposite the first direction, to rotate a second drive member, such as a second drive pulley 26, associated with a second cable 28 operably connected to a mechanically driven, second driven member 30.

In accordance with another aspect of the disclosure, the method 1000 can include a step 1300 of regulating energization and de-energization of the motor 38 via a sensor 112 to detect the relative position of at least one of the common gear 34, first drive member 20, and/or second drive member 26.

In accordance with another aspect of the disclosure, the method 1000 can include a step 1400 of providing a lost motion connection between at least one of the first cable 22 and the first drive member 20 and the second cable 28 and the second drive member 26.

In accordance with another aspect of the disclosure, the method 1000 can include a step 1500 of causing the first cable 22 and the second cable 28 to be driven over different distances while the common gear 34 is rotated over the same number of degrees from a home position.

In accordance with another aspect of the disclosure, the method 1000 can include a step 1600 of providing a radii and/or geometric shape of the first cam surface 21 and the second cam surface 27 being different from one another to provide the desired drive torque and movement of the respective first cable 22 and second cable 28 as the common gear 34 is rotated.

In accordance with another aspect of the disclosure, the method 1000 can include a step 1700 of providing the pair of separate mechanically driven members 24, 30 as being members of at least one of a latch 15 for a vehicle closure 17 and a presenter 19 for a vehicle closure member 17.

In accordance with another aspect of the disclosure, the method 1000 can include a step 1800 of providing the pair of separate mechanically driven members 24, 30 as being a pawl 24 and a cinch lever 30 of a latch 15.

In accordance with another aspect, as shown in FIG. 18, a system 12 having a latch 15 and a remote actuator mechanism 13 therefor is illustrated. Latch 15 includes pawl 24 and cinch lever 30, as discussed above, with a sensor 112' configured to detect relative positions of latch components. Actuator 13 is configured in operable communication with controller 116, with a power source 38' shown therebetween. Controller 116 is configured to receive command signals, such as via an actuatable button, switch and or proximity sensor device 58, 58', as discussed above.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch system for a closure panel of a vehicle, the latch system comprising:

a power actuator;

a ratchet configured for pivoting movement between at least one closed position and an open position, wherein the ratchet is biased toward the open position;

at least one pawl configured in operable communication with the power actuator via a mechanically actuatable first cable and being configured for pivoting movement between at least one locking position relative to the ratchet and at least one unlocking position relative to the ratchet in response to movement of the first cable via selective powered actuation of the power actuator; and a cinch lever configured for operable communication with the power actuator via a second cable and being configured for pivoting movement between a released, uncinched position and an actuated, cinched position in response to movement of the second cable via selective actuation of the power actuator, the cinch lever being biased toward the released, uncinched position;

wherein the first cable and the second cable are operably coupled to a common gear, the common gear having a home position and being rotatable from the home position in a first direction whereupon the at least one pawl is caused to pivot between the at least one locking position and the at least one unlocking position, and the common gear being rotatable from the home position in a second direction opposite the first direction, whereupon the cinch lever is caused to pivot between the released, uncinched position and the actuated, cinched position; and wherein the at least one pawl includes a primary pawl having a primary locking position and a primary unlocking position, included in the at least one locking position and the at least one unlocking position, respectively, and a secondary pawl having a secondary locking position and a secondary unlocking position included in the at least one locking position and the at least one unlocking position, respectively, wherein the primary pawl moves from the primary locking position to the primary unlocking position via the first cable upon a first actuation of the power actuator causing a first rotation of the common gear from the home position in the first direction and wherein the secondary pawl moves from the secondary locking position to the secondary unlocking position via the first cable upon a second actuation of the power actuator causing a second rotation of the common gear from the home position in the first direction.

2. The latch system of claim 1, further including a sensor configured to detect when the common gear is in the home position.

3. The latch system of claim 1, further including a first drive member coupled to the common gear and a second drive member attached to the common gear, wherein the second cable has a lost motion connection with the second drive member such that the second cable and the common gear move relative to one another as the common gear rotates from the home position in the first direction.

4. The latch system of claim 3, wherein the first drive member is formed as separate component from the common gear, wherein the first drive member moves relative to the common gear, and the second drive member is fixed against relative movement with the common gear.

5. The latch system of claim 4, wherein the common gear has a drive lug and the first drive member has a driven lug, the drive lug being configured for driving engagement with the driven lug.

6. The latch system of claim 5, wherein the driven lug is biased into engagement with the drive lug by a biasing member.

7. The latch system of claim 3, wherein the first drive member has a first cam surface configured for engagement with the first cable and the second drive member has a second cam surface configured for engagement with the second cable.

8. The latch system of claim 7, wherein the first cam surface has a first geometric contour about which the first cable is configured to wrap and the second cam surface has a second geometric contour about which the second cable is configured to wrap, the first geometric contour and the second geometric contour being different from one another.

9. The latch system of claim 1, wherein the closure panel is configured for use with a frunk.

10. A method of mechanically actuating a first pawl and a second pawl of a latch with a power actuator having a single motor, the method comprising:

energizing the single motor in a first energization to rotate a common gear from a home position in a first direction to rotate the first pawl associated with a first cable operably connected to the first pawl;

energizing the single motor in a second energization to rotate the common gear from the home positon in the first direction to rotate both the first pawl and the second pawl associated with the first cable operably connected to the second pawl.

11. The method of claim 10, further including configuring a drive member fixed to the common gear to move a cinch lever via a second cable.

12. The method of claim 11, further including providing a lost motion connection between the second cable and the drive member.

13. The method of claim 11, further including causing the first cable and the second cable to be driven over different distances while the common gear is rotated over the same number of degrees from the home position.

14. The method of claim 11, further including energizing the single motor to rotate the common gear from the home positon in a second direction, opposite the first direction, to move the cinch lever.

15. The method of claim 14, further including providing a coupling lever adapted to move the second pawl, wherein the first energization of the single motor causes the first pawl to move to an unlocking position, and the second energization of the single motor causes the coupling lever to move the second pawl to an unlocking position.

16. A latch system for a closure panel of a vehicle, the latch system comprising:

a power actuator;

a ratchet configured for pivoting movement between at least one closed position and an open position, wherein the ratchet is biased toward the open position;

at least one pawl configured in operable communication with the power actuator via a mechanically actuatable first cable and being configured for pivoting movement between at least one locking position relative to the ratchet and at least one unlocking position relative to the ratchet in response to movement of the first cable via selective powered actuation of the power actuator; and a cinch lever configured for operable communication with the power actuator via a second cable and being configured for pivoting movement between a released, uncinched position and an actuated, cinched position in response to movement of the second cable via selective actuation of the power actuator, the cinch lever being biased toward the released, uncinched position;

wherein the at least one pawl includes a primary pawl having a primary locking position and a primary unlocking position, included in the at least one locking position and the at least one unlocking position, respectively, and a secondary pawl having a secondary locking position and a secondary unlocking position included in the at least one locking position and the at least one unlocking position, respectively, wherein the primary pawl moves from the primary locking position via the first cable to the primary unlocking position upon a first actuation of the power actuator and wherein the secondary pawl moves from the secondary locking position via the first cable to the secondary unlocking position upon a second actuation of the power actuator.

17. The latch system of claim 16, further including a coupling lever adapted to move the secondary pawl, wherein the power actuator is configured to move the coupling lever to release the secondary pawl from the ratchet upon the second actuation of the power actuator.

18. The latch system of claim 16, wherein both the primary pawl and the secondary pawl are adapted to move to the primary and secondary unlocking positions, respectively, upon the second actuation of the power actuator.

* * * * *